(12) United States Patent
Borkgren et al.

(10) Patent No.: US 11,014,741 B2
(45) Date of Patent: May 25, 2021

(54) CLOSURE ARRANGEMENT FOR TANK OPENING OF AGRICULTURAL MACHINE

(71) Applicant: Deere & Company, Moline, IL (US)

(72) Inventors: Stanley R. Borkgren, Geneseo, IL (US); Terry L. Snipes, East Moline, IL (US); Tyler G. Groves, Bettendorf, IA (US); William D. Graham, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 521 days.

(21) Appl. No.: 15/056,727

(22) Filed: Feb. 29, 2016

(65) Prior Publication Data
US 2017/0073155 A1    Mar. 16, 2017

Related U.S. Application Data

(63) Continuation-in-part of application No. 14/853,338, filed on Sep. 14, 2015, now Pat. No. 10,322,658.

(51) Int. Cl.
*B65D 90/10* (2006.01)
*A01C 15/00* (2006.01)
(Continued)

(52) U.S. Cl.
CPC ............ *B65D 90/10* (2013.01); *A01C 15/006* (2013.01); *B65D 25/28* (2013.01); *B65D 43/22* (2013.01);
(Continued)

(58) Field of Classification Search
CPC ...... B65D 90/10; B65D 88/128; B65D 43/26; B65D 43/262; B65D 43/265; B65D 43/267; B60P 1/00; F16J 13/22
See application file for complete search history.

(56) References Cited

U.S. PATENT DOCUMENTS 3,694,962 A    10/1972   McDonald et al.
4,461,219 A *  7/1984   Bateson ................. B65D 90/10
                                                 105/377.07
(Continued)

FOREIGN PATENT DOCUMENTS

CN        202493672 U      10/2012
CN        203463182 U       3/2014

OTHER PUBLICATIONS

Exhibit 1, Images of AMITY 5250, undated, admitted prior art.
(Continued)

*Primary Examiner* — Jeffrey R Allen
(74) *Attorney, Agent, or Firm* — Klintworth & Rozenblat IP LLP

(57) ABSTRACT

A closure assembly is disclosed for a work machine having a supply tank with a tank opening. The closure assembly has a lid and lift, actuator and latch mechanisms. When the closure assembly is attached to the tank, the lift mechanism is configured to support the lid off of the tank opening. The actuator mechanism mounts to the lid to move the lid with respect to the tank opening between first and second positions in which in the first position the lid overlies the tank opening and in the second position the lid is substantially clear of the tank opening. The latch mechanism may be moved into a latched orientation in which when the lid is in the first position the latch mechanism latches the lid into engagement with the tank opening.

14 Claims, 16 Drawing Sheets

(51) Int. Cl.
*B65D 25/28* (2006.01)
*B65D 43/22* (2006.01)
*B65D 43/26* (2006.01)
*B65D 88/12* (2006.01)

(52) U.S. Cl.
CPC .......... *B65D 43/26* (2013.01); *B65D 88/128* (2013.01); *B65D 2525/283* (2013.01)

(56) References Cited

U.S. PATENT DOCUMENTS

| | | | | |
|---|---|---|---|---|
| 5,141,125 | A * | 8/1992 | Canty | B01J 3/004 220/377 |
| 5,660,295 | A * | 8/1997 | Hroma | B65D 90/10 105/377.06 |
| 6,679,651 | B2 * | 1/2004 | Robinson | B65D 90/00 404/25 |
| 6,902,082 | B2 | 6/2005 | Mabry et al. | |
| 7,658,570 | B2 | 2/2010 | Hill et al. | |
| 2004/0069193 | A1 | 4/2004 | Memory | |
| 2005/0166458 | A1 * | 8/2005 | McKenzie | B60P 3/226 49/394 |
| 2012/0325812 | A1 | 12/2012 | Guinart Pallares et al. | |

OTHER PUBLICATIONS

Exhibit 2, Image of Bourgault 7950, Jun. 15, 2011.
Exhibit 3, Images of Case New Holland P1070 & 3580, undated, admitted prior art.
Exhibit 4, Image of Great Plains ADC2350B, undated, admitted prior art.
Exhibit 5, Images of Horsch Anderson SW1000, Jun. 22, 2012.
Exhibit 6, Images of Morris 9450 and 9650, undated, admitted prior art.
Exhibit 7, Images of Salford Commodity Cart, Jun. 22, 2012.
Exhibit 8, Images of Seed Hawk 800, Jun. 19, 2013.
Exhibit 9, Images Seed Master NOVA XP 780, undated, admitted prior art.
Exhibit 10, Images of Versatile Commodity Cart, undated, admitted prior art.
Exhibit 11, Images of Montag Commodity Cart, undated, admitted prior art.
Exhibit 12, Norwoodsales.com, S3 Commercial Tender Brochure, undated, admitted prior art.
Exhibit 13, Image of Seed Shuttle 500, undated, admitted prior art.
Exhibit 14, Images of Pressurized Compartment Lids, undated, admitted prior art.
USPTO, Final Office Action in U.S. Appl. No. 14/853,338 dated Jan. 23, 2018.

* cited by examiner

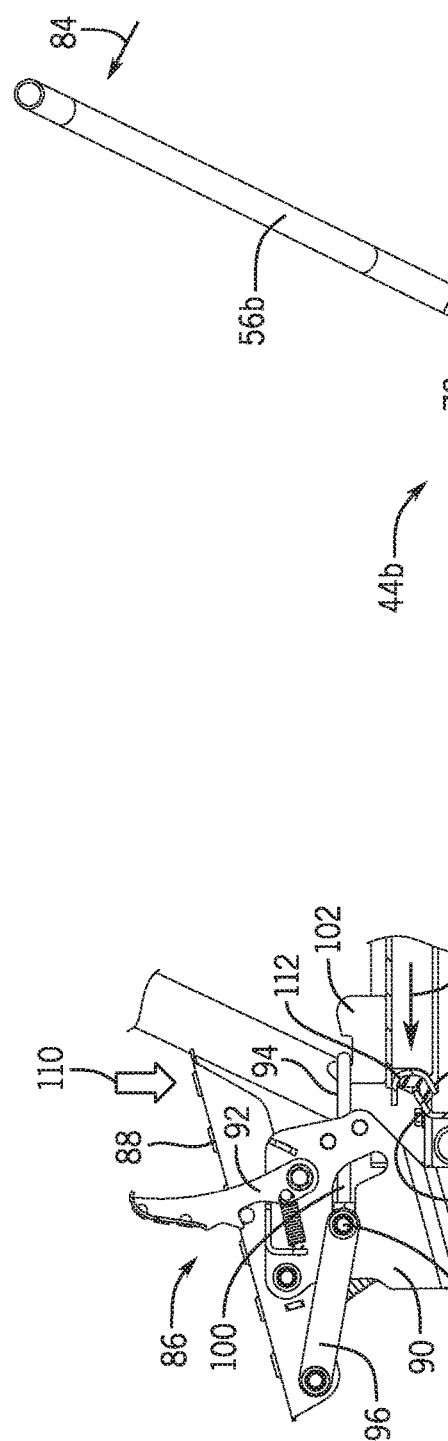
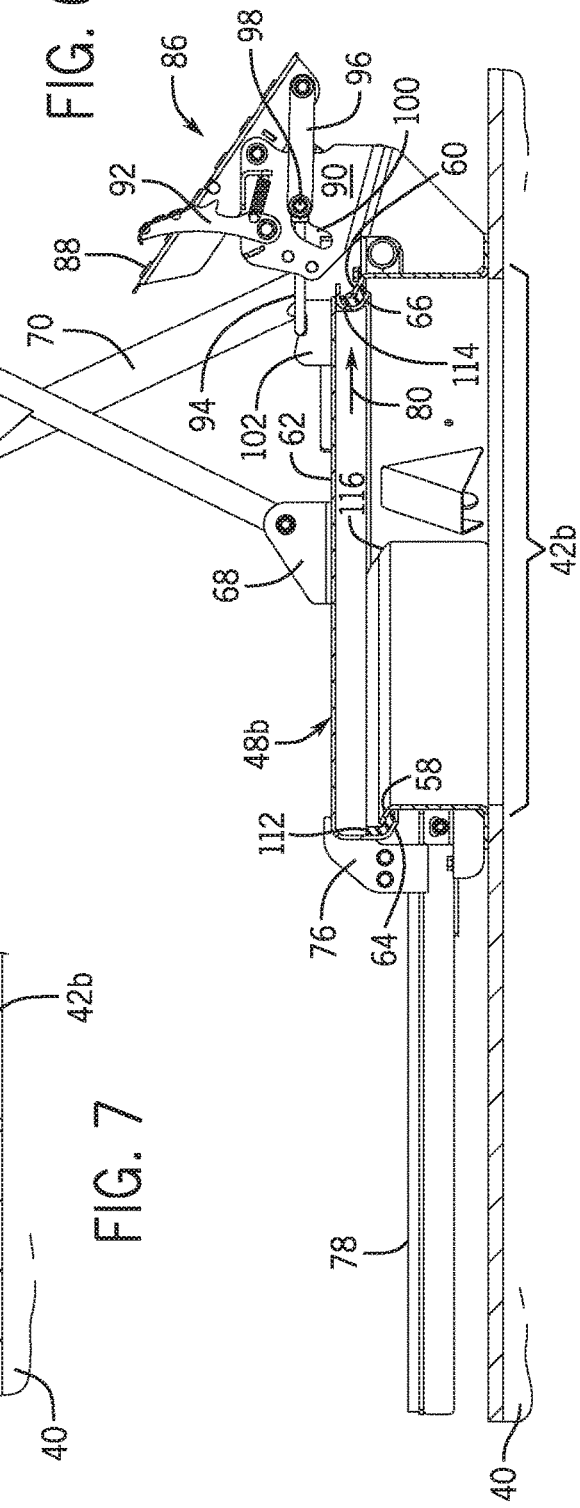
FIG. 7
FIG. 6

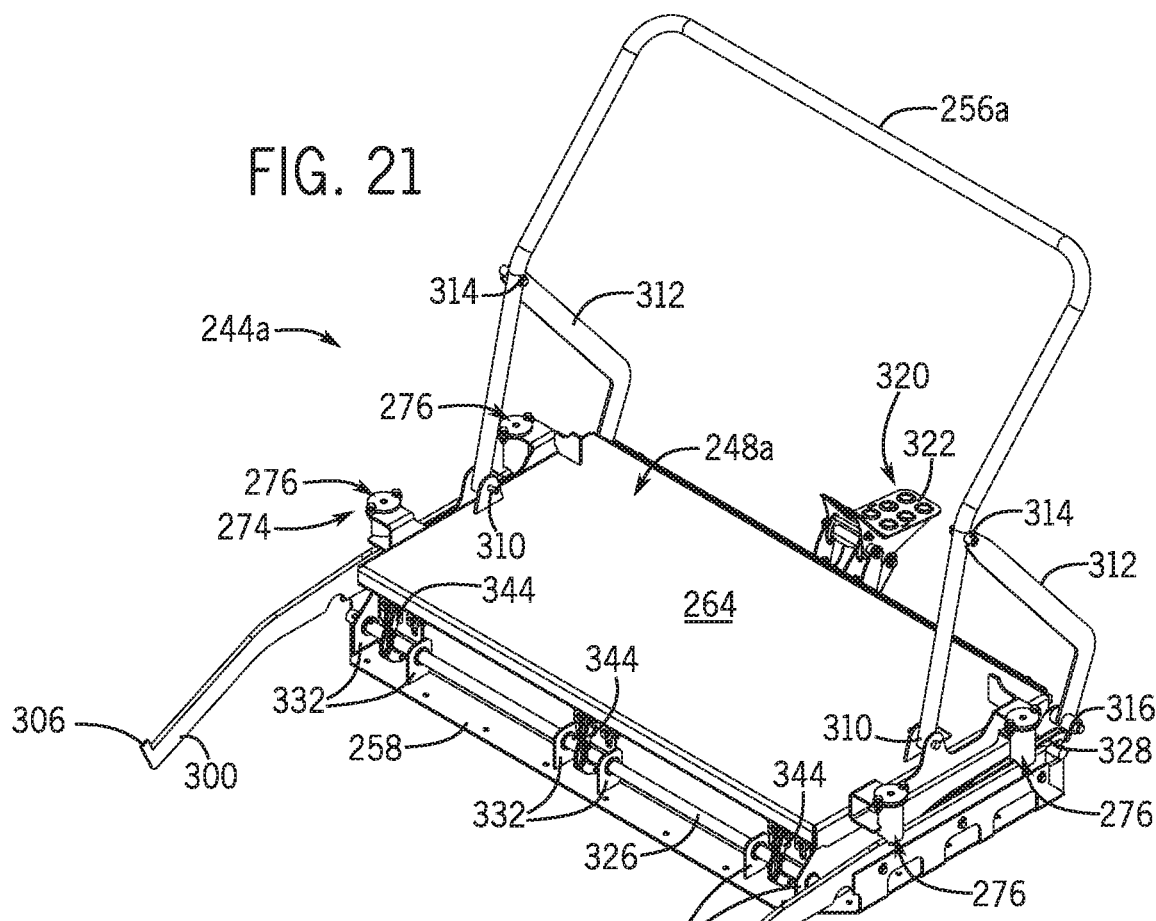

CLOSURE ARRANGEMENT FOR TANK OPENING OF AGRICULTURAL MACHINE

CROSS-REFERENCE TO RELATED APPLICATION(S)

This application is a continuation-in-part of U.S. patent application Ser. No. 14/853,338, filed on Sep. 14, 2015.

STATEMENT OF FEDERALLY SPONSORED RESEARCH OR DEVELOPMENT

Not applicable.

FIELD OF THE DISCLOSURE

This disclosure relates to closure mechanisms, including closures for openings in tanks of agricultural machines.

BACKGROUND OF THE DISCLOSURE

Various work vehicles, agricultural machines and the like may carry large supply tanks or containers for various materials. As one example, supply carts for use with seeding machines have one or more tanks that contain various liquid or dry materials, such as fertilizers, seeds and the like. Typically, the tanks have large openings at their tops that are used to fill the tanks with material. Lids cover and seal the openings from outside of the tanks.

In practice, the supply carts are towed in a train with the seeding machine (e.g., before or after the seeding machine) by a tractor running over a field. The supply carts may have a pressurized delivery system that transfers materials within the tanks to the seeding machine. For dry materials, for example, the delivery system may be a forced air system. In any case, the tanks may be pressurized internally, and the corresponding internal force of pressurization acting on the relatively large tank lids may tend to dislodge or otherwise disrupt the seals at the openings. This may lead to pressure loss and poor operation of the delivery system as well as loss or contamination of the material supply.

SUMMARY OF THE DISCLOSURE

This disclosure provides a closure arrangement that may be configured to seal the openings of containers, including pressurized supply tanks, used in various work vehicles, such as supply carts for seeding machines.

In one aspect the disclosure provides a closure assembly, which may be used in a workmachine having a supply tank with a tank opening. The closure assembly includes a lid and lift, actuator and latch mechanisms. When the closure assembly is attached to the tank, the lift mechanism is configured to support the lid off of the tank opening. The actuator mechanism mounts to the lid to move the lid with respect to the tank opening between first and second positions in which in the first position the lid overlies the tank opening and in the second position the lid is substantially clear of the tank opening. The latch mechanism is movable into a latched orientation in which when the lid is in the first position the latch mechanism latches the lid into engagement with the tank opening.

Another aspect of the disclosure provides a work machine having a supply tank with a tank opening. A closure assembly includes a lid sized to close the tank opening as well as a lift mechanism, a handle and a latch mechanism. The lift mechanism is mounted between the tank and the lid to support the lid off of the tank opening. The handle is mounted between the tank and the lid and to move the lid with respect to the tank opening between first and second positions in which in the first position the lid overlies the tank opening and in the second position the lid is substantially clear of the tank opening. The latch mechanism is mounted between the tank and the lid and movable into a latched orientation in which when the lid is in the first position the latch mechanism latches the lid into engagement with the tank opening.

Another aspect of the disclosure provides a work machine having a supply tank with a tank opening. A closure assembly includes a lid sized to close the tank opening and a handle mounted between the supply tank and the lid. The handle moves the lid with respect to the tank opening between first and second positions in which in the first position the lid overlies the tank opening and in the second position the lid is substantially clear of the tank opening. A standing platform mounted to the work machine has a handrail. When the lid is in the first position, an upper end of the handle forms a part of the handrail.

The details of one or more embodiments are set forth in the accompanying drawings and the description below. Other features and advantages will become apparent from the description, the drawings, and the claims.

BRIEF DESCRIPTION OF THE DRAWINGS

FIGS. 5 and 6 are cross-sectional views of the closure assembly shown in FIGS. 3 and 4 in open and closed positions, respectively;

FIG. 7 is a cross-sectional view of a portion of the closure assembly shown in FIGS. 3-6 illustrating a foot-operated latch in greater detail;

FIGS. 21 and 22 are perspective views of one example closure assembly in FIG. 20 shown in a closed (and latched) position;

Like reference symbols in the various drawings indicate like elements.

DETAILED DESCRIPTION

Figure 1:
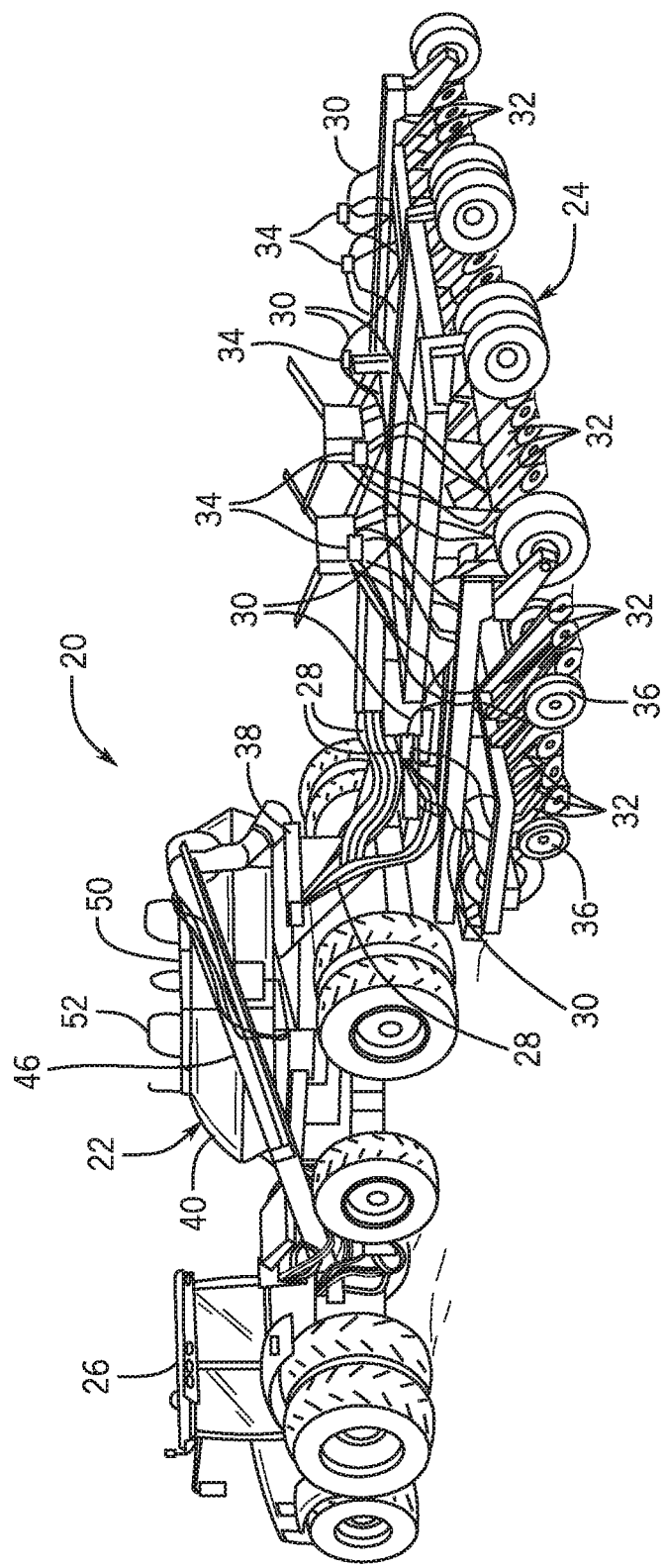
FIG. 1 is a perspective view of an air commodity dispersal (ACD) system including an ACD cart, as illustrated in accordance with an example embodiment.

The following describes one or more example embodiments of the sealed closure arrangement for a tank opening, as shown in the accompanying figures of the drawings described briefly above. Various modifications to the example embodiments may be contemplated by one of skill in the art.

Closure assemblies having pressure-energized, under seal lids are provided. The closure assemblies may be useful to sealingly enclose pressurized tanks of an agricultural machine, such as an air commodity dispersal ("ACD") cart. As indicated by the term "pressure-energized," the closure assemblies may be configured such that pressure loading on a tank lid (specifically, pressure exerted on the interior of the tank lid) tends to reinforce, rather than compromise, the seal formed by the closure assembly when the tank lid is closed. This is highly desirable in the context of an ACD cart, which often includes a number of relatively large tank openings to permit seed, fertilizer, and other agricultural commodities to be spread about the interior of the pressurized supply tank during filling. As a corollary, such ACD carts also often include relatively large tank lids that, when sealed closed over the tank openings and exposed to even modest internal air pressures, are subject to significant pressure loading forces due to the relatively large lid surface areas on which the internal tank pressures act. In the case of conventional closure assemblies, such significant pressure loading may potentially dislodge the sealing elements or otherwise compromise the integrity of the seal formed between the tank openings and the tank lids when closed. In contrast, embodiments of the pressure-energized closure assemblies provide a high integrity, low leakage seal even when subject to relatively significant internal pressure loading. This, in turn, allows prolonged operation of the ACD cart at optimum pneumatic performance levels, while avoiding contamination of the agricultural commodities contained within the pressurized supply tank.

In addition to providing a low leakage seal during pressure loading, embodiments of the closure assemblies may provide other benefits and functionalities. For example, the closure assemblies may include handles, which project upwardly from the tank lids to provide convenient manual access in embodiments wherein the closure assemblies are manually opened by an operator standing above the tank lids, as may be the case when the closure assemblies are positioned along the upper walkway or platform of an ACD cart. Additionally, the handles may provide a gate function by blocking openings in the railing of the platform when the tank lids are in closed positions, while rotating or otherwise moving into positions permitting unfettered manual access to the tank openings when the tank lids are opened. Embodiments of the closure assembly may further allow the sealing interface formed around the tank lid and the tank opening to fully disengage or "unseat" with a relatively short travel of the tank lid away from its closed position. This, in turn, may allow the tank lid to be manually opened with relative ease and help reduce seal wear. In still further embodiments, the closure assemblies may each include a pull-action latch, which exerts a lateral closure or pre-load force in the direction in which the tank lid is closed when the latch is engaged to help seal any vertical transition areas of the seal interface and thereby further enhance seal integrity. The latch may be foot-operated in embodiments wherein the closure assemblies are manually opened by an operator standing above the tank lids. The closure assemblies may also include various other features to facilitate opening and closing of the tank lids, to enhance seal integrity when the lids are closed, to increase safety, or to provide other such benefits, as described below.

In other embodiments, the closure assemblies may provide low leakage sealing of pressurized tanks in ACD carts without themselves being pressure-energized. Such closure assemblies may still include large lids and handles that project upwardly from the tank lids to provide convenient manual opening of the lids. The handles may also provide a gate or railing function by filling in openings in the railing of the platform when the lids are in closed positions, while rotating or otherwise moving into positions permitting unfettered access to the tank openings when the lids are opened. Embodiments of the closure assembly may further allow the sealing interface formed between the lid and the tank opening to fully disengage or "unseat" with a relatively short travel of the lid away from its latched closed position albeit here in a direction generally normal to the plane of the tank opening. In still further embodiments, the closure assemblies may each include a pull-action latch, which exerts a downward closure or pre-load force along multiple points around the periphery of the lid in the direction in which the lid is closed when the latch is engaged to enhance seal integrity. Further, the latch may be foot-operated in embodiments wherein the closure assemblies are manually opened by an operator standing above the tank lids.

With reference now to the drawings, example closure arrangements will be described in the context of a commodity dispersal system, including an agricultural tractor towing an air cart and an air seeding or planting machine. While such a system is illustrated as an example herein, one skilled in the art will recognize that the example closure arrangements disclosed herein may be readily adapted for use with other types work vehicles or other non-vehicle applications. As such, the present disclosure should not be limited to applications associated with the disclosed.

Referring now to FIG. 1, an ACD system 20, including an ACD cart 22 and a seeding machine 24, is illustrated in accordance with an example embodiment of the present invention. During operation, the ACD system 20 is pulled by a tractor 26 or otherwise moved across a field to distribute one or more agricultural commodities, such as seeds and fertilizer, held within the ACD cart 22. The agricultural commodities are carried by pressurized airstreams from the ACD cart 22 to the seeding machine 24, which then deposits or plants the commodities in the soil over which the ACD system 20 travels. A network of air conduits or plumbing lines 28, 30 conduct the commodity-entrained airstreams to a number of deposition tubes 32, which are arranged in different row units laterally spaced across the seeding machine 24. More specifically, a relatively small number of main air lines 28 may initially conduct the commodity-entrained airstreams from the ACD cart 22 to a number of distribution towers 34 mounted to the seeding machine 24 at various locations. The distribution towers 34 may then divide the airstreams amongst a larger number of secondary air lines 30, which then convey the commodity to the deposition tubes 32 for planting or deposition within the ground. The row units of the seeding machine 24 may also include various ground-engaging tools 36 (only a few of which may be seen in FIG. 1), which assist in the commodity deposition process by, for example, opening furrows, packing soil, and closing furrows over the newly-deposited commodities.

Figure 2A:
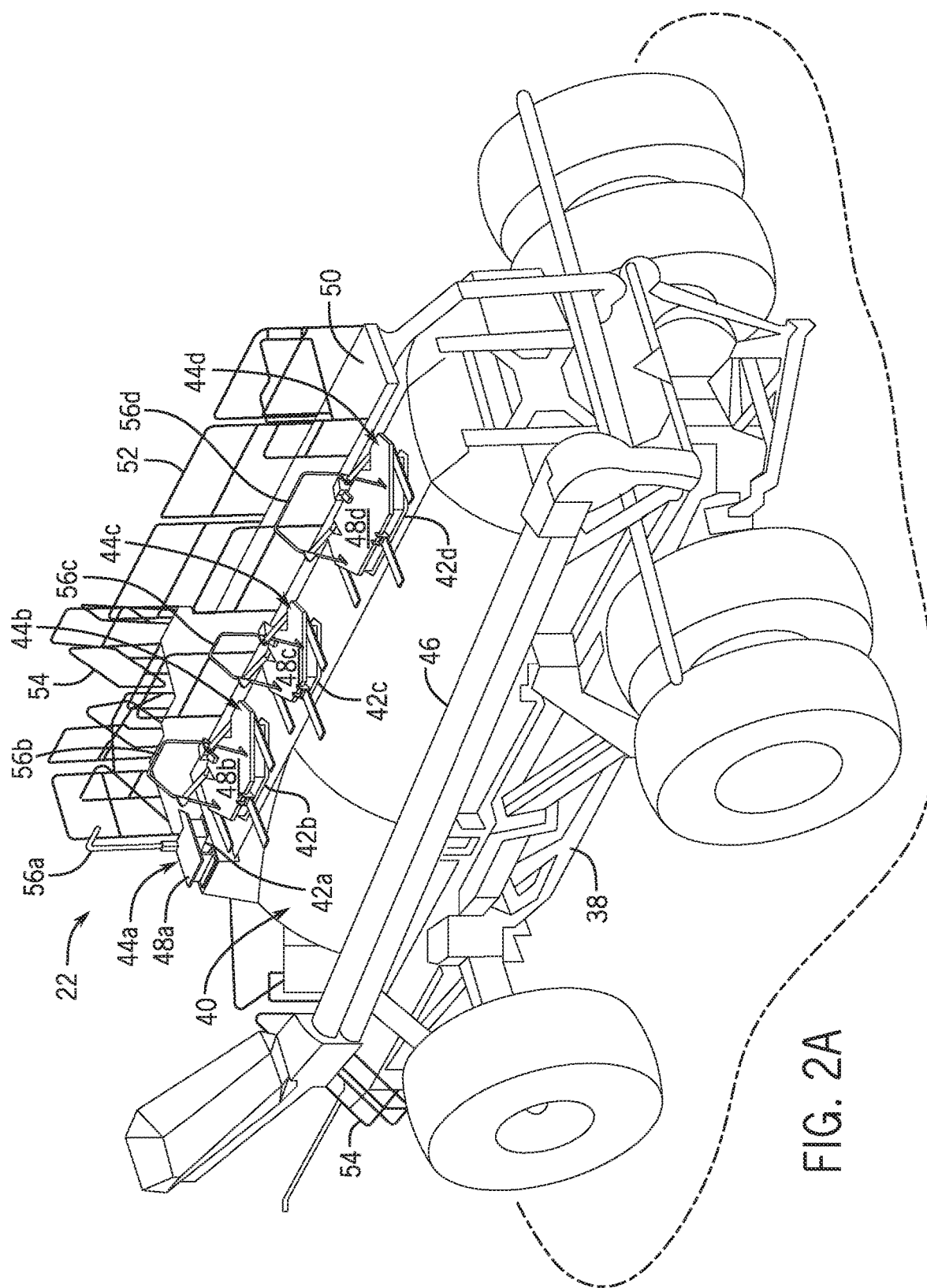
FIG. 2A is a perspective view of the ACD cart shown in FIG. 1 illustrating a number of closure assemblies installed around the openings of a pressurized supply tank, as illustrated in accordance with a further example embodiment.
Figure 2B:
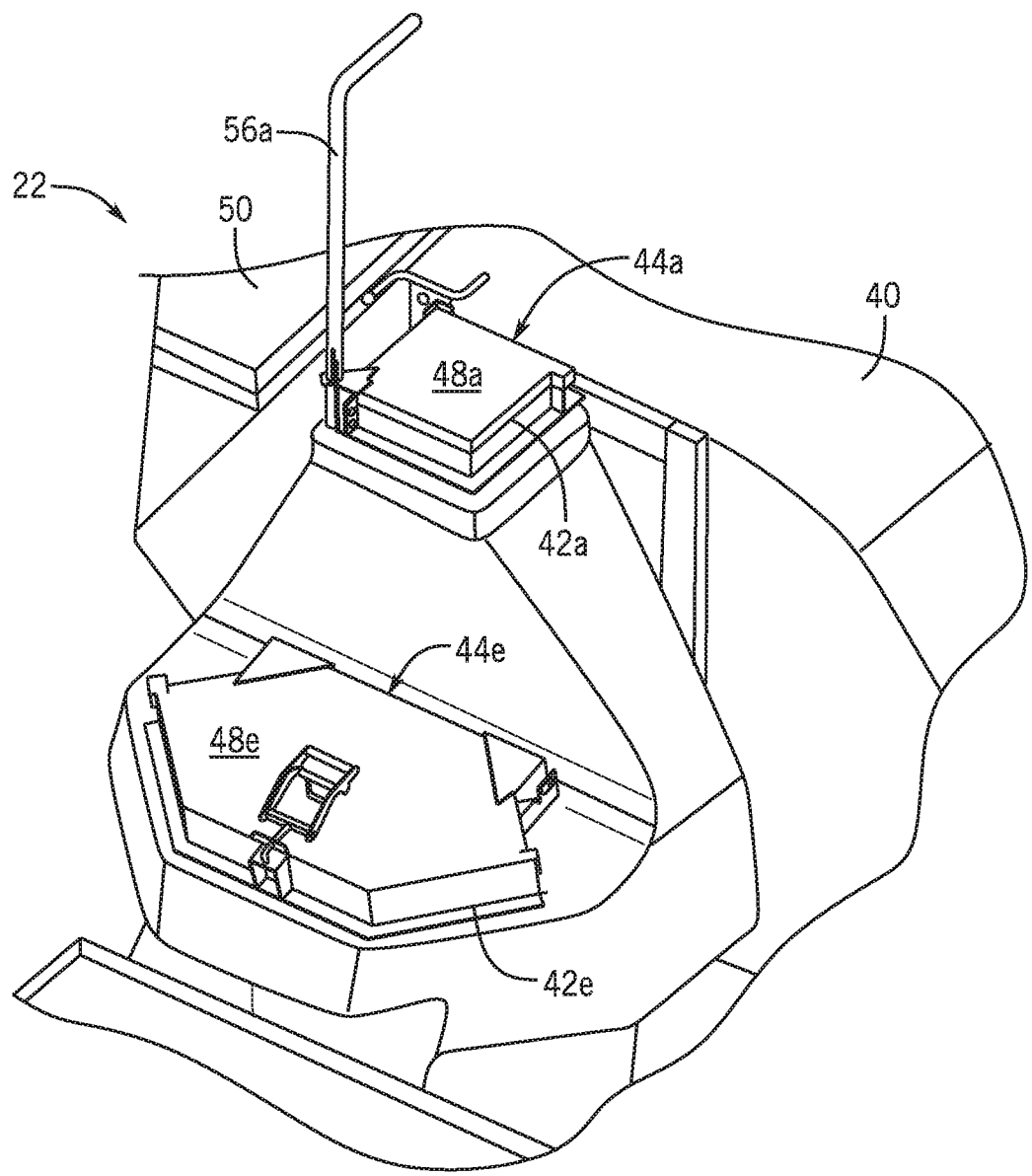
FIG. 2B is a more detailed view of a portion of the ACD cart shown in FIGS. 1 and 2A illustrating some of the closure assemblies installed on the ACD cart.

Turning to FIGS. 2A-B, it may be seen that the ACD cart 22 includes a wheeled chassis or frame 38 on which one or more pressurized supply tanks are mounted, such as pressurized supply tank 40. The pressurized supply tank 40 may have multiple internally-partitioned compartments or "commodity chambers" each suitable for holding one or more types of agricultural commodities. A number of tank openings 42 are provided in pressurized supply tank 40 and each provide physical access to a corresponding commodity chamber within tank 40. Four such tank openings 42a-d are visible in FIG. 2A and spaced along the topside of pressurized supply tank 40. Additionally, a fifth tank opening 42e is provided in a forward portion of pressurized supply tank 40 as shown most clearly in the partial view of the ACD cart 22 shown in FIG. 2B. In further embodiments, the ACD cart 22 may include fewer or a greater number of the tank openings 42, which may provide access to any number of compartments or chambers contained within the pressurized supply tank 40. The tank openings 42 are desirably produced to be relatively large to permit commodities to be spread about the commodity chambers in a substantially even or distributed manner during filling. The tank openings 42 may vary size in conjunction with their corresponding commodity chambers, which may likewise vary in size depending upon the particular volume of commodity each chamber is intended to hold. As shown in FIGS. 1 and 2A, the ACD cart 22 may be equipped with movable conveyor arm 46 to facilitate filling of the commodity chambers corresponding to the tank openings 42a-e.

Pressure-energized closure assemblies 44a-e are installed over the tank openings 42a-e, respectively. The pressure-energized closure assemblies 44a-e include tank lids 48a-e, which are movable between closed and open positions. In the closed position, the tank lids 48a-e sealingly cover their respective tank openings 42a-e. The tank lids 48a-d are positioned along an elongated platform 50 extending above and along the length of the pressurized supply tank 40. The platform 50 is surrounded by a railing 52 and accessible utilizing a stairway 54 located adjacent the forward end of pressurized supply tank 40. The closure assemblies 44a-d further include handles 56a-d, respectively, which project upwardly from the tank lids 48a-d to allow an operator to move the lids 48a-d between their open and closed positions while standing on the platform 50. Openings or gateways are provided in the railing 52 to provide access to the handles 56a-d. The openings provided in the railing 52 are blocked by the handles 56a-d when the tank lids 48a-d are closed as shown in FIG. 2A, but rotate or otherwise move into non-blocking positions when the tank lids 48a-d are opened. In this manner, the handles 56a-d effectively serve as gates that open in conjunction with the opening of the closure assemblies 44a-d, but otherwise remain in a closed or blocking orientation to help enclose the perimeter of platform 50 for safety purposes. Additional description of the manner in which the handle 56b, and by extension the handles 56c and 56d, may provide such a gate functionality is provided below in conjunction with FIGS. 3-6. The closure assembly 44e (FIG. 2a) does not include such a handle as the tank lid 48e may be readily accessed by an operator utilizing the stairway 54, while standing such that the tank lid 48e is approximately waist to chest height.

As previously noted, the tank openings 42a-e may have relatively large planform dimensions to permit commodities to be spread about the commodity chambers in a substantially even or distributed manner during initial filling. The tank lids 48a-e are thus likewise imparted with relatively large planform dimensions equivalent to or greater than the corresponding dimensions of their respective tank openings 42a-e. During operation of the ACD cart 22, the commodity chambers are pressurized in conjunction with generation of the pressurized airstreams in which metered amounts of the commodities are entrained. The internal pressures created within the commodity chambers may not be exceptionally high, perhaps on the order of about 2 pounds per square inch (about 14 kilopascal). Significant pressure loading forces may still be exerted on the interior of the tank lids 48a-e by the pressurized air within the commodity chambers, however, due to the relatively large surfaces of the tank lids 48a-e exposed to the elevated internal pressures. For example, one or more of the tank lids 48a-e may be subject to pressure loading forces approaching or exceeding about 2000 pounds (about 900 kilograms), depending upon the effective inner surface areas of the tank lids and the interior pressures created within the commodity chambers. In contrast to conventional sealed lid designs, the closure assemblies 44a-e are uniquely adapted to leverage such pressure loading forces to strengthen rather than weaken the seal created between the tank openings 42a-e and the tank lids 48a-e when closed, as described more fully below.

Figure 3:
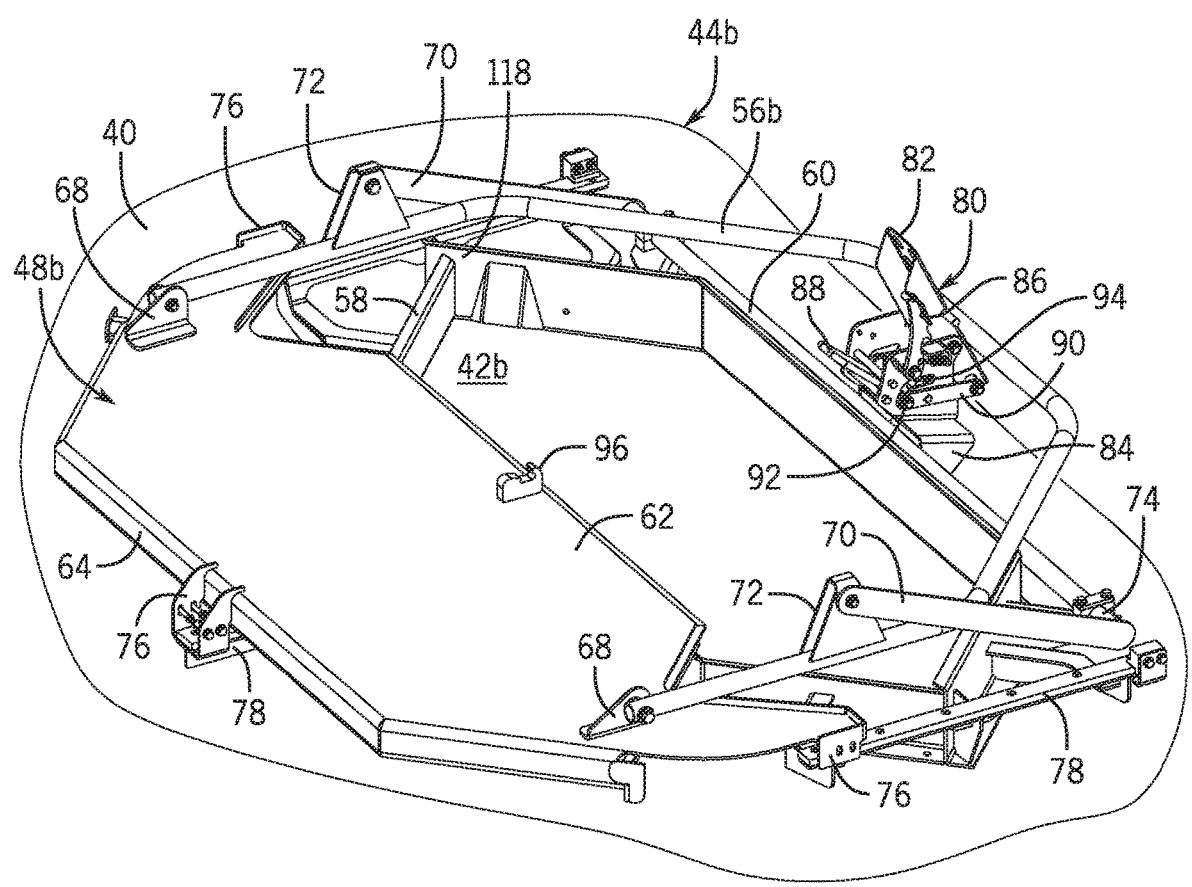
FIGS. 3 and 4 are perspective views of a pressure-energized closure assembly in open and closed positions, respectively, as illustrated in accordance with a further example embodiment.
Figure 4:
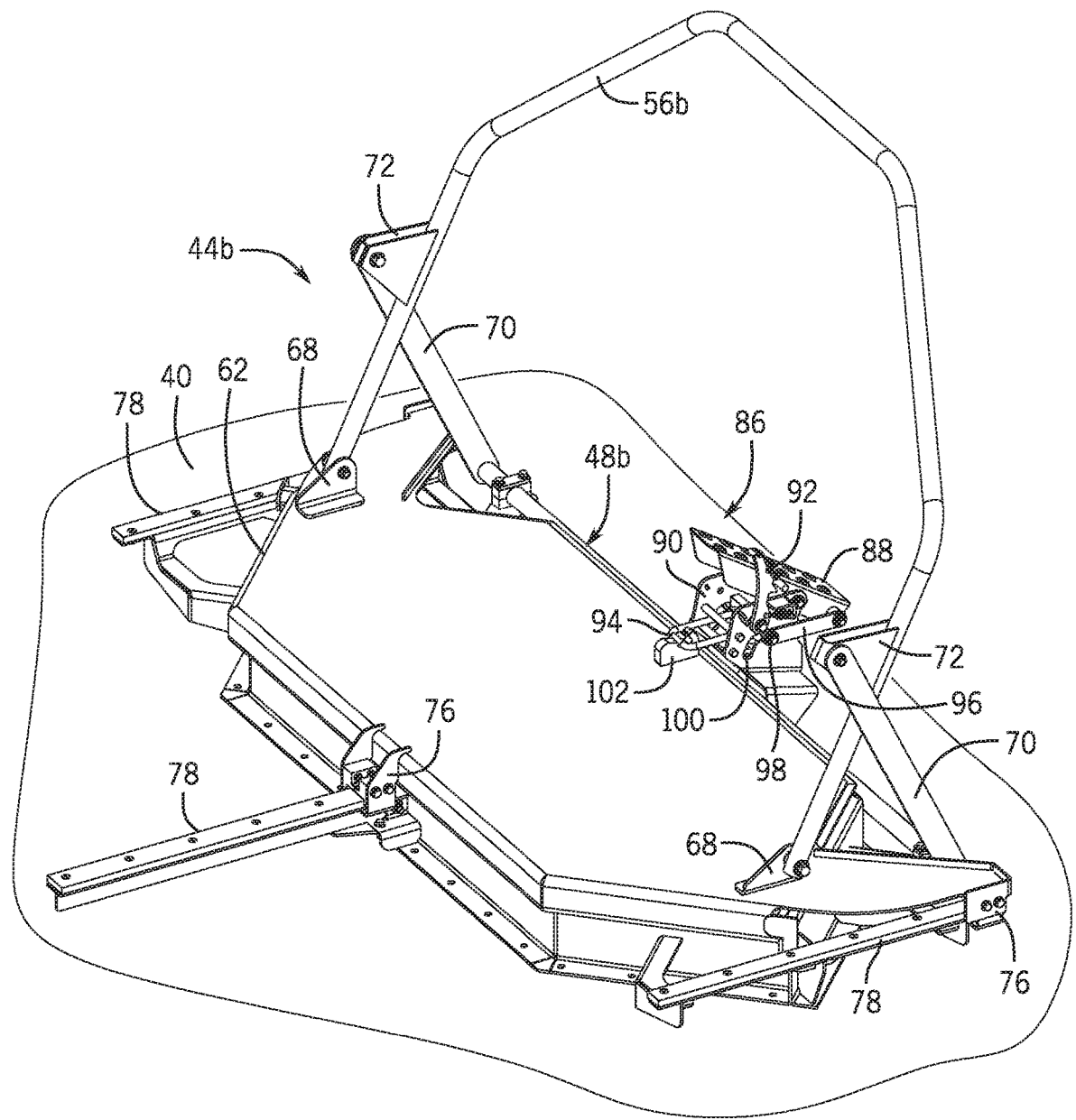

FIGS. 3 and 4 are detailed views of the closure assembly 44b illustrating the tank lid 48b in open and closed positions, respectively. As the closure assembly 44b is similar or substantially to the closure assemblies 44c and 44d shown in FIGS. 2A-B, the following description is equally applicable thereto. As can be seen most readily in FIG. 3, the closure assembly 44b further includes a staggered or stepped tank opening flange 58, 60, which extends along the periphery of the tank opening 42b. The stepped tank opening flange 58, 60 includes first and second tank flange lips 58 and 60, which each extend along a peripheral segment of the stepped tank opening flange 58, 60. The tank flange lips 58 and 60 may be formed as bends in an upper portion of the tank flange 58, 60. Similarly, the tank lid 48b includes a substantially flat cover 62 and a staggered or stepped lid flange 64, 66, which extends around the periphery of the cover 62. As does the stepped tank opening flange 58, 60, so too does the stepped lid flange 64, 66 include two lips: a first lid lip 64 and a second lid lip 66, which each extend along a peripheral segment of the stepped lid flange 64, 66. The lid lips 64 and 66 may be formed as bends or curls in the underside of the cover 62. The tank flange lips 58 and 60 extend, at least in part, toward a first side of the pressurized supply tank 40. Conversely, the lid lips 64 and 66 extend, at least in part, toward a second side, opposing side of the pressurized supply tank 40. Thus, at least a part of the tank flange lip 58 and the lid lip 64 are located on the exterior of the pressurized supply tank 40 when the tank lid 48b is in the closed position, while at least a least a part of the tank flange lip 60 and the lid lip 66 are located on the interior of the tank 40 when the tank lid 48b is closed. When the tank lid 48b is moved into the closed position shown in FIG. 4, a low leakage or ultralow leakage, 360 degree seal may be created between the stepped tank opening flange 58, 60 the stepped lid flange 64, 66 to sealingly enclose the tank opening 42b. The manner in which the stepped tank opening flange 58, 60, the stepped lid flange 64, 66, and perhaps other structural features of the closure assembly 44b (e.g., one or more compressible seals) cooperate to produce such a low leakage, 360 degree seal is described more fully below in conjunction with FIGS. 5-9. First, however, additional description of the manner in which the tank lid 48b of the closure assembly 44b transitions between the open and closed positions will be provided.

An operator utilizes the handle 56b of the closure assembly 44b to move the tank lid 48b between the open and closed positions shown in FIGS. 3 and 4, respectively. The motion path traveled by the tank lid 48b when transitioning between the open and closed positions, and relatedly the manner in which the handle 56b is joined to the tank lid 48b, may vary amongst embodiments. In the case of the example closure assembly 44b, the lower ends of the handle 56b are pivotally coupled to the tank lid 48b by hinge joints 68. Additionally, middle portions of the handle 56b are each pivotally coupled to the upper terminal end of a pivot bar 70 by a hinge joint 72. The opposing lower terminal ends of the pivot bars 70 are, in turn, pivotally or rotatably mounted to the stepped tank opening flange 58, 60 or to other static structure of the ACD cart 22 (FIGS. 1-2B) by one or more rotatable couplings 74, such as a rotatable bar-type coupling (FIG. 3). In the illustrated example, movement of the tank lid 48b is further restrained to sliding motion along a single (e.g., lateral) axis by a series of guides 76, which are affixed to the tank lid 48b at different locations. Each guide 76 slidably engages an elongated rail 78, which is affixed to the stepped tank opening flange 58, 60 or to other static structure of the ACD cart 22 (FIGS. 1-2B) and which projects from the tank opening flange 58, 60 is a laterally outboard direction (to the left in FIGS. 3 and 4).

Figure 5:
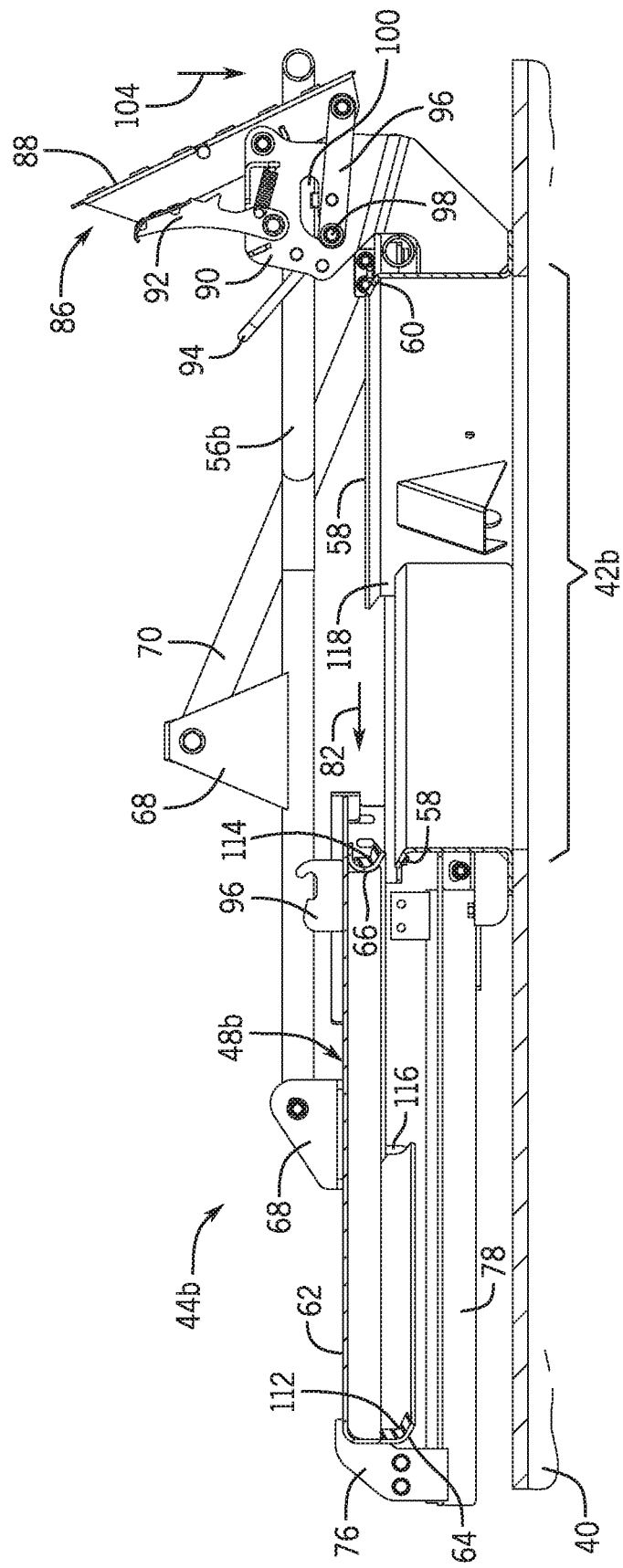

By virtue of the above-described structural arrangement, an operator standing on the platform 50 (to the right of the handle 56b in FIGS. 3 and 4) may manipulate the handle 56b to move the tank lid 48b from the open position shown in FIG. 3 to the closed position shown in FIG. 4. This may be more fully appreciated by referring to FIGS. 5 and 6, which further illustrate the closure assembly 44b in open and closed positions, respectively, in cross-section. The manner in which the tank lid 48b slides in a laterally outward direction (that is, away from the centerline of the pressurized supply tank 40) when moved into the open position is indicated in FIG. 5 by arrow 82. Conversely, the manner in which the tank lid 48b slides in a laterally inward direction (that is, toward the centerline of the pressurized supply tank 40) when moved into the closed position is indicated in FIG. 5 by arrow 82. When the tank lid 48b is open, the handle 56b resides in a flat or stowed orientation, as shown in FIGS. 3 and 5. To close the tank lid 48b, an operator need only pull upwardly on the handle 56b in the manner indicated by arrow 84 in FIG. 6. In response to this manually-applied force, the handle 56b and the pivot bars 70 simultaneously rotate in opposite directions and into the substantially upright positions shown in FIGS. 4 and 6. Concurrently, a sliding force is exerted on the tank lid 48b at the hinge joints 68 sufficient to move the tank lid 48b into the closed position (FIGS. 4 and 6).

Notably, the handle 56b remains readily within the reach of an operator on the platform 50 (to the right in FIGS. 3-6) when the tank lid 48b is in both open and closed positions. The operator need not reach over the tank opening 42b to grasp the handle 56b when the tank lid 48b is open. Furthermore, when the tank lid 48b is moved into the open position (FIGS. 3 and 5) by an operator, the handle 56b rotates into a substantially flat or stowed orientation providing unfettered manual access to the tank opening 42b by the operator while standing on the platform 50. By comparison, the handle 56b physically blocks manual access to the covered tank opening 42b by an operator standing on the platform 50 when the tank lid 48b is in the closed position (FIG. 4). Specifically, the handle 56b blocks an opening provided in the railing 52 surrounding platform 50 (FIGS. 1 and 2A) when the tank lid 48b is in the closed position (FIG. 4). In this manner, the handle 56b of the closure assembly 44b acts as a gate, which provides manual access to the tank opening 42b when needed, but otherwise cooperates with the railing 52 to enclose the perimeter of the platform 50. Safety is improved as a result.

The closure assembly 44b further includes a pull-action latch 86 for selectively securing the tank lid 48b in the closed position (FIG. 4). In the illustrated embodiment wherein an operator stands above the tank lid 48b when utilizing the handle 56b, the latch 86 is conveniently implemented as a foot-operated latch. When so implemented, the latch 86 may include a pivoting pedal 88, a base 90 to which the pivoting pedal 88 is rotatably mounted, and a spring-loaded locking mechanism 92, which is further rotatably coupled to the base 90 and which may also be foot-operated. A catch mechanism 94 (e.g., a U-shaped bar) is further pivotally coupled to a first end of a bar link 96, the opposing end of which is rotatably joined to the pivoting pedal 88. A pin 98 rotatably joins the catch mechanism 94 to the bar link 96 and rides in a curved or arced slot 100 provided in the base 90. A hook 102 is affixed to the tank lid 48b and may be selectively engaged by the catch mechanism 94 to secure or release the tank lid 48 from the closed position. Specifically, the catch mechanism 94 rotates and translates in conjunction with movement of pedal 88 to either engage or disengage hook 102 in the manner described below.

To release the tank lid 48b from the closed position shown in FIGS. 4 and 6, an operator first pivots the spring-loaded locking mechanism 92 in a counterclockwise direction using his or her foot, and subsequently presses downwardly on pivoting pedal 88 in the direction indicated in FIG. 5 by arrow 104. This causes the catch mechanism 94 to rotate upwardly and disengage from the hook 102 thereby freeing the tank lid 48b to slide open in a laterally outward direction. Conversely, to engage the closure assembly 44b, the operator first moves the tank lid 48b adjacent the fully closed position shown in FIGS. 4 and 6 utilizing the handle 56b. Afterwards, and as illustrated in greater detail in FIG. 7, the operator utilizes his or her foot to rotate the pivoting pedal 88 downwardly in the manner indicated by arrow 108. As further indicated by arrow 110 in FIG. 7, this causes latch 86 to translate away from tank opening 42b and thereby exert a clamping or pre-load force on the tank lid 48b urging the stepped lid flange 64, 66 against the stepped tank opening flange 58, 60. Such a pre-load force may help ensure that low leakage seal is provided between the vertical transition areas between the stepped tank opening flange 58, 60 and the stepped lid flange 64, 66, as described below. As the pivoting pedal 88 rotates downward, the spring-loaded locking mechanism 92 engages a projection extending from the pedal 88 to lock the pedal 88 in place until manually released by an operator. In this manner, the pivoting pedal 88 may be utilized to translate catch mechanism 94 toward or away from the side of the pressurized supply tank 40 to which pivoting pedal 88 is mounted.

As previously noted, a low leakage, 360 degree seal is created between the stepped lid flange 64, 66 and the stepped tank opening flange 58, 60 when the tank lid 48b is moved into the closed position shown in FIGS. 4 and 6. In certain embodiments, the stepped lid flange 64, 66 may directly contact the stepped tank opening flange 58, 60 such that a metal-on-metal seal is created between the tank flange lips 58 and 60 and the lid lips 64 and 66, respectively. A more robust seal may be created, however, by positioning one or more compressible seals between the lid lips 64 and 66 and the tank flange lips 58 and 60. In the illustrated example, a compressible seal 112, 114 is carried by the tank lid 48b and extends over the lid lips 64 and 66. More specifically, the compressible seal 112, 114 includes a first seal part 112 extending along the interior of lid lip 64, and a second seal part 66 extending along the exterior of the lid lip 66. The seal parts 112 and 114 may be integrally formed as a single (e.g., molded) piece, which forms a complete ring having a planform shape generally conforming to the shape of the tank lid 48b. Alternatively, the seal parts 112 and 114 may be produced as discrete pieces or seals, which are separately affixed to the lid lips 64 and 66, respectively. In this case, the seal part 112 may be produced to have a substantially U-shaped geometry extending along three sides of the tank lid 48b, while the seal part 114 may be produced to have a linear or substantially straight geometry extending along the fourth side of the tank lid 48b. In one embodiment, the compressible seal 112, 114 is a cast urethane seal, which is glued, bolted, or otherwise attached to the tank lid 48b. The compressible seal 112, 114 may also have a downward sloped geometry (e.g., a windshield wiper-type geometry) to minimize the likelihood of commodities becoming trapped between the seal 112, 114 and the stepped tank opening flange 58, 60. In other embodiments, the compressible seal 112, 114 may have other shapes, compositions, and may be attached to the compressible seal 112, 114 in other manners. Additionally, in further embodiments, multiple compressible seals may be utilized, and one or more seals may be affixed to the stepped tank opening flange 58, 60 in addition to or in lieu of the seal or seals affixed to the tank lid 48b.

Figure 8:
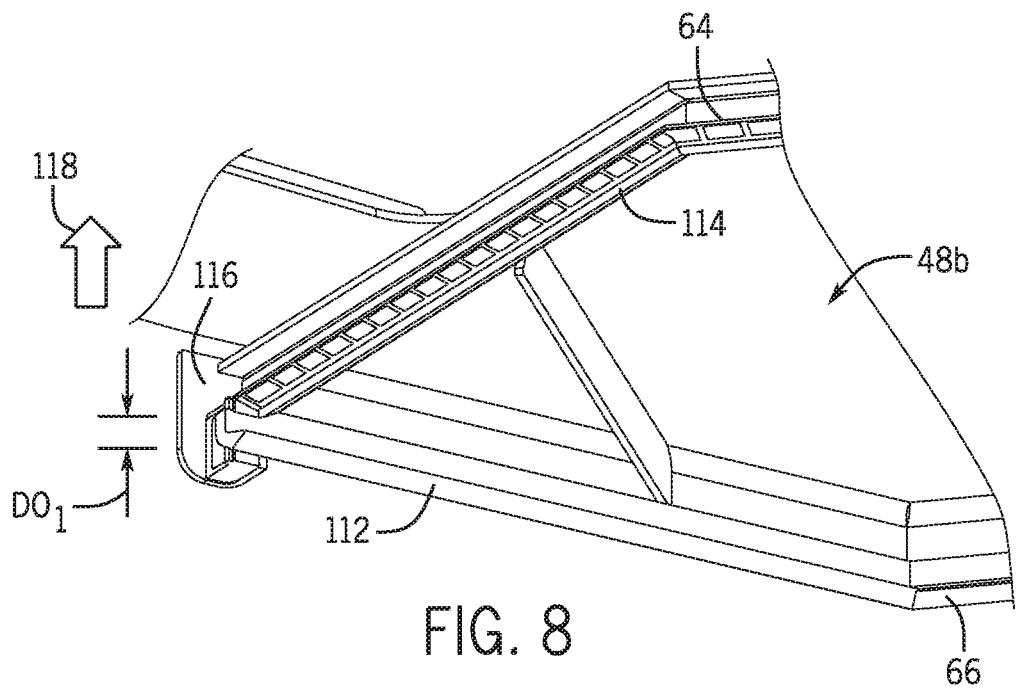
FIGS. 8 and 9 are perspective views illustrating corner regions of the tank lid and the tank opening flange, respectively.
Figure 9:
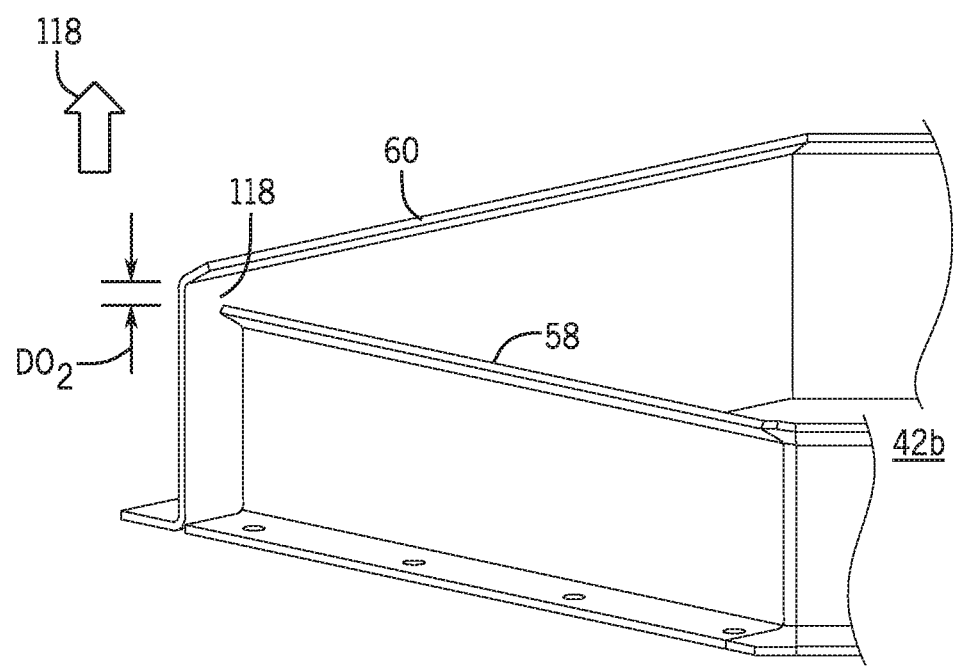
Figure 10:
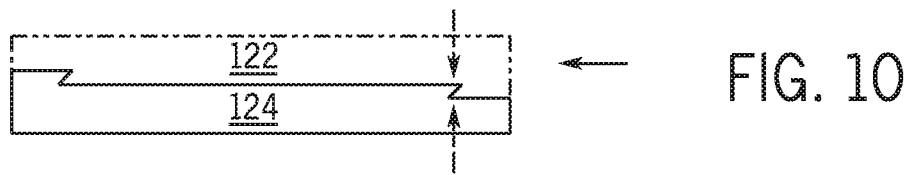
FIGS. 10-19B are schematics illustrating a number of different closure assemblies in open and closed positions.
Figure 11:
Figure 12:
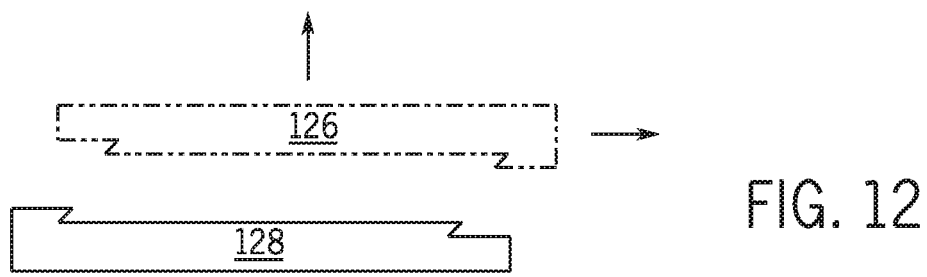
Figure 13:
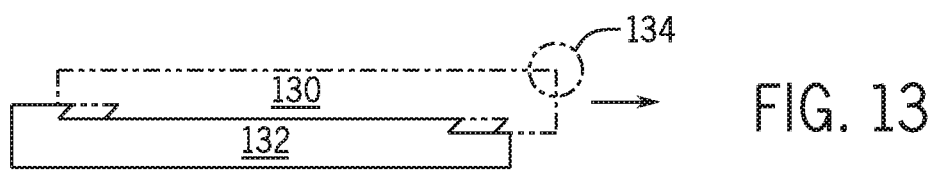
Figure 14:
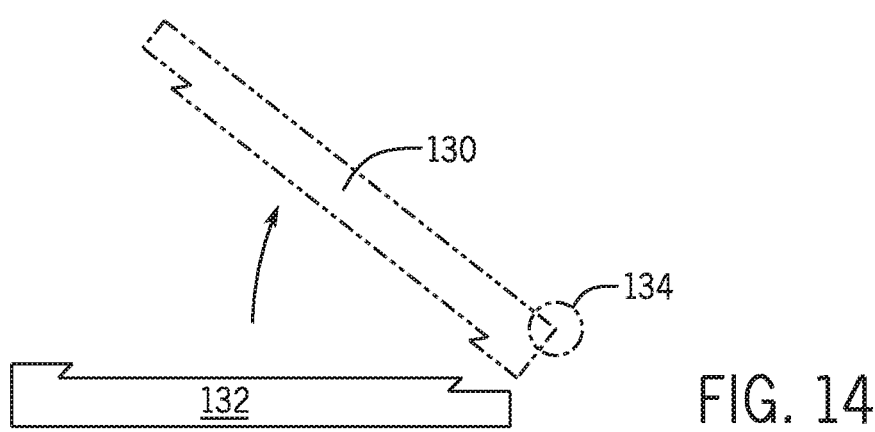

Referring now to FIGS. 8 and 9 in conjunction with FIGS. 3-7, the lid lips 64 and 66 are stepped or offset in a direction opposite the interior of the pressurized supply tank 40 (referred to herein as the "offset direction"). Due to this offset, the tank lid 48b further includes two lid flange transition walls 116, which extend between the lid lips 64 and 66 in the offset direction. The offset direction is identified by arrows 120 shown in FIGS. 8 and 9, which are detailed views of an underside corner region of the tank lid 48b and a corner region of the stepped tank opening flange 58, 60, respectively. In the case of the example closure assembly 44b, the offset direction is substantially vertical (parallel with the direction of gravity); however, this need not always be the case. Additionally, while forming substantially perpendicular angles with the lid lips 64 and 66 in the illustrated example, the lid flange transition walls 116 may be slanted or angled with respect to the lid lips 64 and 66 in further embodiments. The tank flange lips 58 and 60 are likewise offset in an direction opposite the interior of the pressurized supply tank 40 and are separated by tank flange transition walls 118 (shown in FIGS. 3-6 and FIG. 9). The lid lips 64 and 66 may be offset by a first step height or offset distance (identified by convergent arrows "$DO_1$" in FIG. 8), while the tank flange lips 58 and 60 may be offset by a second step height or offset distance (identified by convergent arrows "$DO_2$" in FIG. 9). $DO_2$ may correspond to (e.g., be substantially equivalent to) to offset distance $DO_1$ to ensure alignment between the lid lips 64 and 66 and the tank flange lips 58 and 60 when the tank lid 48b is moved into the closed position.

The compressible seal 112, 114 is disposed between the stepped tank opening flange 58, 60 and the stepped lid flange 64, 66 such that, when the tank lid 48b is moved into the closed position (FIGS. 4 and 6), the compressible seal 112, 114 engages the tank flange lips 58 and 60 from an interior side of the pressurized supply tank 40. The seal 112, 114, engages the tank flange lips 58 and 60 of the stepped tank opening flange 58, 60 from the tank interior side and further engages walls of the tank flange lips 58 and 60 from the exterior side of the pressurized supply tank 40, as taken in the offset direction. In this manner, the compressible seal 112, 114 is compressed between the lid lips 64 and 66 and the tank flange lips 58 and 60, respectively, to create a low leakage (e.g., airtight or near airtight) seal extending around the periphery of the interface between the tank lid 48b and the tank opening 42b when the tank lid 48b is closed. Additionally, the angled surfaces of the compressible seal 112, 114 form a wedge with the angled surfaces of the tank flange lips 58 and 60 under the lateral preload force exerted by the foot-operated latch 86 (FIGS. 3-6) to initially compress and thereby energize seal 112, 114. During operation of ACD cart 22 (FIGS. 1-2B), pressure loading urging movement of the tank lid 48b away from pressurized supply tank 40 further urges compressible seal 112, 114 against the angled surfaces of the tank flange lips 58 and 60 in such a wedged relationship to further reinforce the seal. Additionally, the lateral preload force exerted by the foot-operated latch 86 may compress any sections of the compressible seal 112, 114 extending over the lid flange transition walls 116 against the tank flange transition walls 188 to seal the vertical transition areas between the staggered or stepped sets of flange lips included within both the tank opening flange 58, 60 and the lid flange 64, 66. Little to no leakage of pressurized air is thus permitted between sealed interface created between compressible seal 112, 114 and tank opening flange 58, 60 to optimize performance of ACD cart 22 and to help prevent contamination of the agricultural commodities contained therein. This is highly beneficial.

There has thus been described an example embodiment of a pressure-energized closure assembly (e.g., closure assembly 44b) well-suited for enclosing the pressurized supply tank of an ACD cart or another agricultural machine. In the above-described example, the closure assembly is configured such that the tank lid moves along a linear, single degree of freedom (DOF) sliding path when transitioning between closed and open positions. In further embodiments, the closure assembly may move along other paths, including multi-DOF or compound motion paths, providing that the tank lid 48b may slidably disengage from the stepped tank opening flange to unseat the seal formed therebetween. Additionally, it is often desirable for the tank to be moved into a position wherein the tank lid 48b uncovers the tank opening in its entirety or substantial entirety to provide unfettered manual access thereto. Many different structural arrangements may be provided for conveying or guiding the movement of the tank lid in this manner. Consider, for example, the schematic examples shown in FIGS. 10-14 illustrating several pressure-energized closure assemblies having tank lids (shown in phantom) movable with respect to tank opening flanges. In the example shown in FIGS. 10 and 11, the illustrated closure assembly includes a tank lid 122, which is slidably disengaged from a tank opening flange 124 along a linear axis in a manner similar to the example closure assembly 44b described above in conjunction with FIGS. 1-9. In contrast, in the case of the example closure assembly shown in FIG. 12, the illustrated tank lid 126 is slid along a linear path (to the right in FIG. 12) to unseat the seal formed with the illustrated tank opening flange 128 and subsequently moved upward to uncover the tank opening surrounded by the tank opening flange 128. As a still further example, in the case of the closure assembly shown in FIGS. 13 and 14, the illustrated tank lid 130 is initially slid in a linear direction to unseat the seal formed with the illustrated tank opening flange 132 and subsequently rotated or pivoted about a hinge joint 134 to provide access to the tank opening surrounded by the tank opening flange 132. Still further motion paths may be followed by the tank lid when transitioning between open and closed positions in alternative embodiments of the pressure-energized closure assemblies. For example, in the case of the closure assembly 44a shown in FIGS. 2A-2B, an operator may rotate the handle 56a to move the tank lid 48a between open and closed positions. The handle 56a also rotates from a blocking position to a non-blocking position in conjunction with opening of the tank lid 48a to provide a gate function, as previously described. Finally, in the case of closure assembly 44e shown in FIG. 2B, an operator may unlatch the tank lid 48e, slide the tank lid 48e toward pressurized supply tank 40 to unseat the seal, and then pivot the tank lid 48e upward into a fully open position.

Figure 15A:
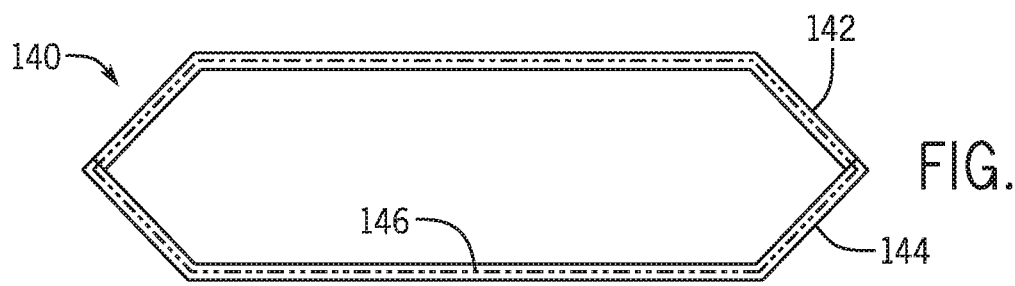
Figure 15B:
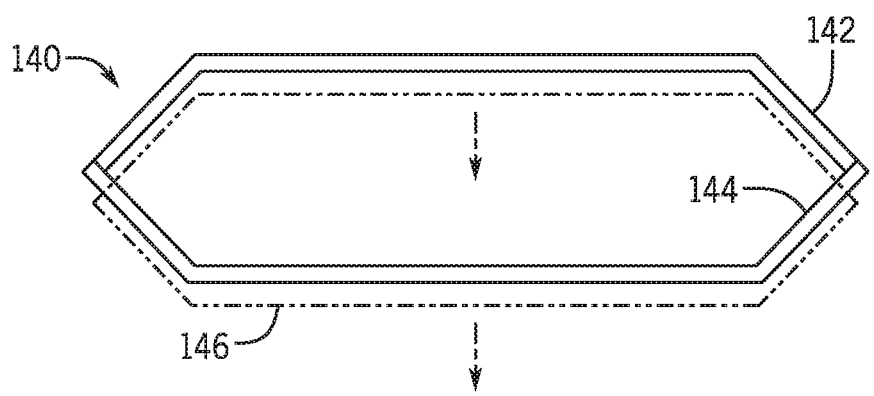
Figure 16A:
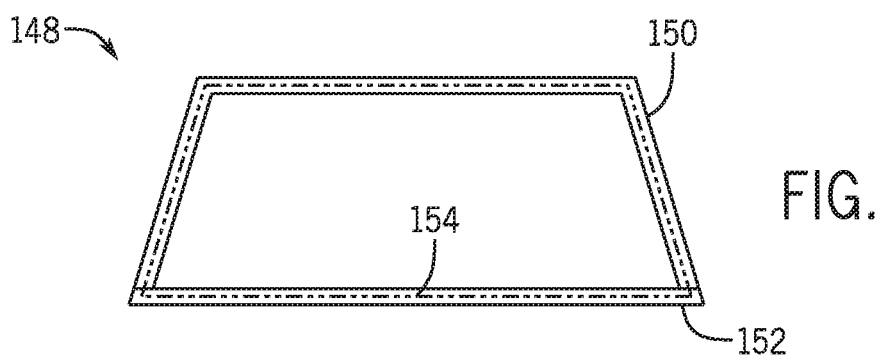
Figure 16B:
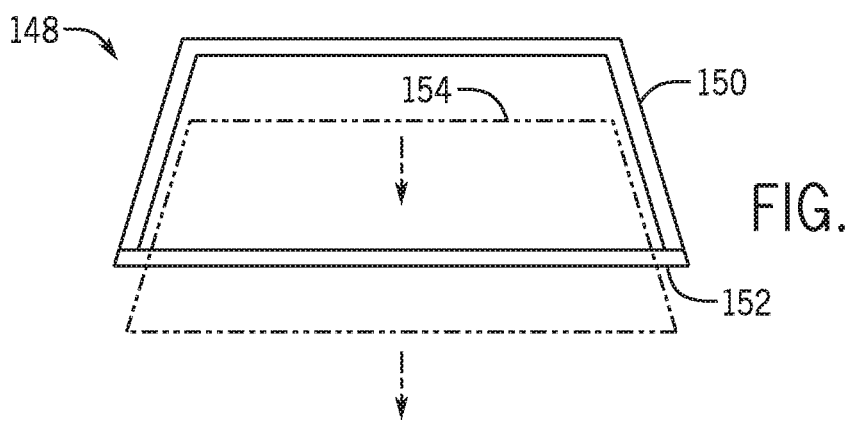

The tank opening flanges and their corresponding lid flanges may be produced to have various shapes, dimensions, and dispositions. In the case of the above-described closure assembly 44b, the stepped tank opening flange 58, 60 and the stepped lid flange 64, 66 each have a planform shape of an elongated diamond. Advantageously, such a shape enables the seal formed between the stepped tank opening flange 58, 60 and the stepped lid flange 64, 66 to unseat within a relatively short travel distance away from the closed position. This may be appreciated by referring to FIGS. 15A-B, which schematically illustrate a pressure-energized closure assembly 140 including a tank opening flange 142, 144 and an overlying tank lid flange 146 (shown in phantom). First and second flange lips 142 and 144 extend around the periphery of the tank opening flange 142, 144 and are offset or stepped in an offset direction (orthogonal to the plane of the page in FIGS. 15A-B). As can be seen, the elongated diamond shape of the tank opening flange 142, 144 and the tank lid flange 146 allow the seal formed therebetween to completely disengage or fully unseat with a relatively short range of travel away from the closed position (FIG. 15A). For example, the illustrated elongated diamond shape with the 45 degree angle ends may require only about 1.5 inches of linear travel in order to allow the lid to pivot. When compared to rectangular openings the linear travel distance would be about the corresponding dimension of the opening flange, which could be 12 inches or more. Such a configuration may thus help to ease manual opening of the closure assembly and reduce seal wear. These advantages notwithstanding, the tank opening flange and the lid flange may have various other geometries and dimensions in further embodiments of the pressure-energized closure assembly. For example, as schematically shown in FIGS. 16A-B, a pressure-energized closure assembly 148 may include a tank opening flange 150, 152 and an overlying tank lid flange 154 (shown in phantom) each having a trapezoidal shape, which increases in width in the direction in which the tank lid travels when slid into an open position in the manner indicated in FIG. 16B. Again, the tank opening flange 150, 152 includes tank flange lips 150 and 152, which are offset in an offset direction. The tank lid flange 154 is likewise provided with an offset lips, which are not shown in FIGS. 16A-B to avoid obscuring the drawing. As may be appreciated by comparing FIGS. 15A-B to FIGS. 16A-B, a longer range of travel may be required to fully unseat the tank lid flange 154 from the tank opening flange 150, 152 relative to the closure assembly 140. However, this range of travel may still be a fraction of the total range of motion over which the tank lid flange 154 travels when the tank lid is moved into the fully open position (not shown).

Figure 17A:
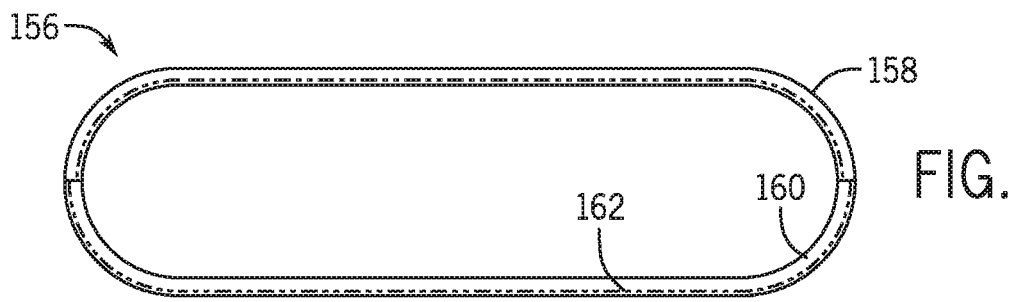
Figure 17B:
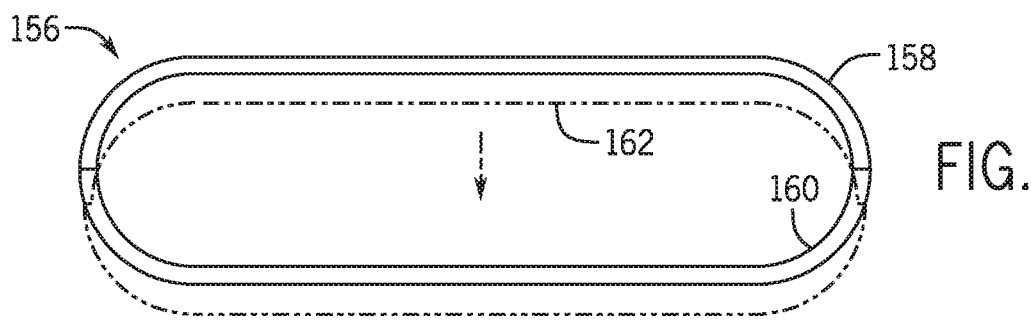
Figure 18A:
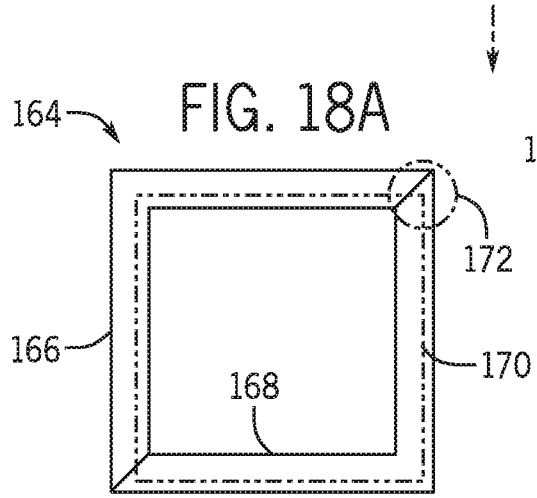
Figure 18B:
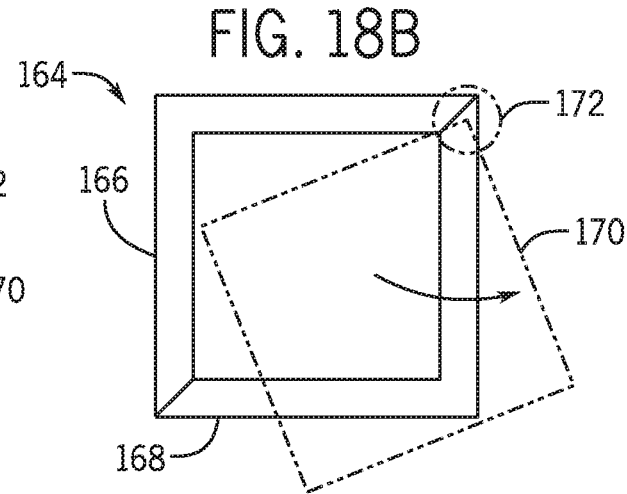
Figure 19A:
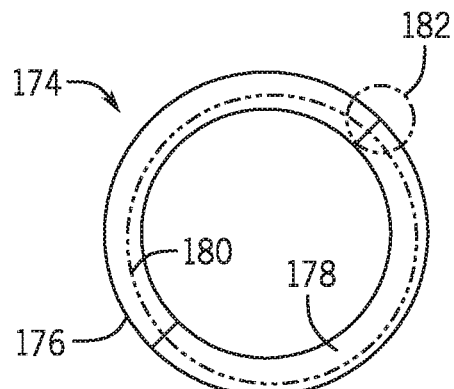
Figure 19B:
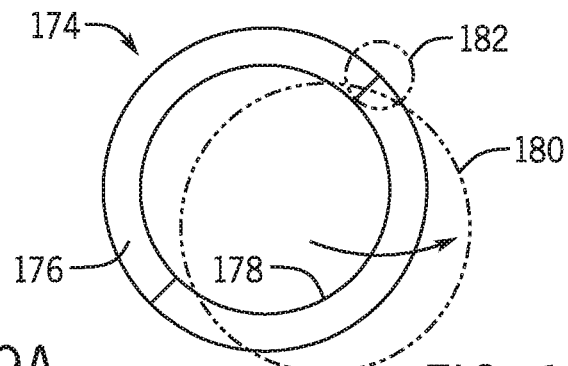

A further example of a pressure-energized closure assembly 156 is shown schematically in FIGS. 17A-B. In this example, the pressure-energized closure assembly includes tank opening flange 158, 160 having offset flange lips 158 and 160. A tank lid flange 162 overlies the tank opening flange 158, 160 when the tank lid bearing flange 162 is in the closed position shown in FIG. 17A. In this embodiment, the tank opening flange 158, 160 and the tank lid flange 162 each have an elongated ovular planform or "racetrack" geometry. As was previously the case, the tank lid bearing the tank lid flange 162 is slidable in a linear direction to unseat the seal formed between tank opening flange 158, 160 and the tank lid flange 162. Still further examples of pressure-energized are shown in FIGS. 18A-19B. Referring specifically to FIGS. 18A-B, there is shown a pressure-energized closure assembly 164 including a tank opening flange 166, 168 and a tank lid flange 170 (shown in phantom), each having a substantially square or rectangular planform shape. In this case, the tank lid bearing the tank lid flange 170 is rotatable with respect to the tank opening flange 166, 168 about a pivot connection 172. The tank lid bearing the tank lid flange 170 may thus be rotated between the seated and unseated positions in the manner shown in FIGS. 18A-B. Finally, yet another example of a pressure-energized closure assembly 174 is shown in FIGS. 19A-B. In this case, the closure assembly 174 includes a tank opening flange 176, 178 and a tank lid flange 180 (shown in phantom), each having a substantially round or circular planform shape. The tank lid bearing the tank lid flange 180 is rotatable about a pivot connection 182 to move the tank lid to seat and unseat the seal formed between the tank opening flange 176, 178 and the tank lid flange 180. The tank lid bearing the tank lid flange 180 may thus be rotated between the seated and unseated positions in the manner shown in FIGS. 19A-B.

Figure 20:
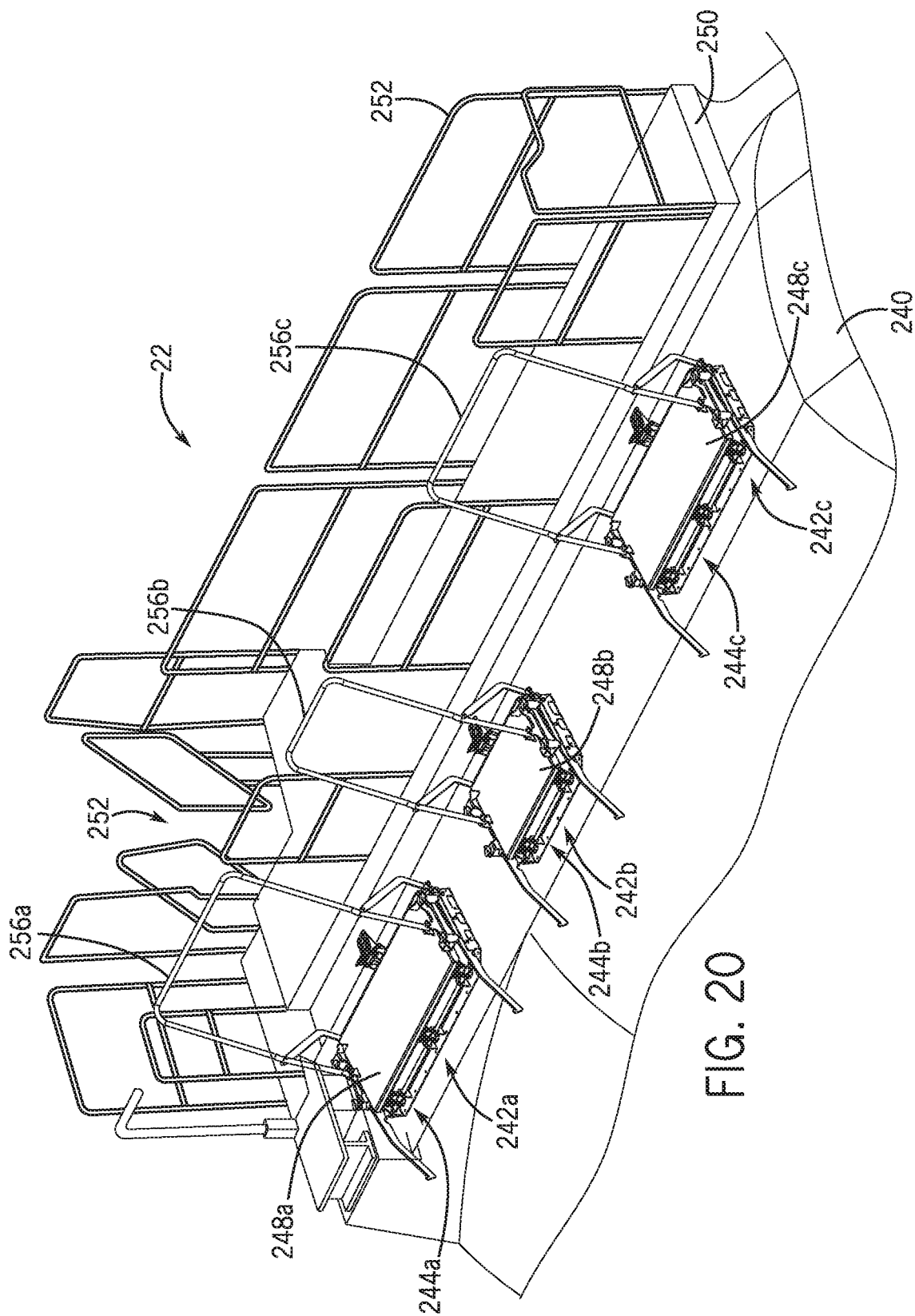
FIG. 20 is a partial perspective view of the ACD cart shown in FIG. 1 illustrating one or more closure assemblies in accordance with a further example embodiment of this disclosure.

In other embodiments, the closure assembly may provide robust sealing of the tank opening without utilizing the internal pressure within the tank. Referring now to FIG. 20, an ACD cart 222 is illustrated in accordance with another example embodiment. The ACD cart 222 may be used in the same manner, as described above, and thus its ability to carry and distribute commodities will not be repeated here. It will also be understood that the ACD cart 222 includes a wheeled chassis or frame (not shown) on which one or more pressurized supply tanks are mounted, including, for example, pressurized supply tank 240. As with other embodiments, the pressurized supply tank 240 may have multiple internally-partitioned compartments or "commodity chambers" each suitable for holding one or more types of agricultural commodities. A number of tank openings 242 are provided in the pressurized supply tank 240 and each provides physical access to a corresponding commodity chamber within the pressurized supply tank 240. Three such tank openings 242a-c are visible in FIG. 20 and spaced along the topside of the supply tank 240. Tank openings 242a and 242c, and thus their closure assemblies, are sized and configured the same. Tank opening 242a, and its closure assembly, is smaller but otherwise similarly configured. However, the ACD cart 222 may include fewer or a greater number of the tank openings 242, which may provide access to any number or size of compartments or chambers contained within the pressurized supply tank 240 and the tank openings 242 may vary size in conjunction with their corresponding commodity chambers or otherwise.

Closure assemblies 244a-c are installed over the tank openings 242a-c, respectively. The closure assemblies 244a-c include tank lids 248a-c, which are movable between closed and open positions. In the closed position, the tank lids 248a-c sealingly cover their respective tank openings 242a-c. The tank lids 248a-c are positioned along an elongated platform 250 extending above and along the length of the pressurized supply tank 240. The platform 250 is surrounded by a railing 252 and accessible utilizing a stairway 254 located adjacent the forward end of pressurized supply tank 240. The closure assemblies 244a-c further include actuator mechanism, such as handles 256a-c, respectively, which project upwardly from the tank lids 248a-c to allow an operator to move the tank lids 248a-c between their open and closed positions while standing on the platform 250. Openings or gateways are provided in the railing 252 to provide access to the handles 256a-c. The openings provided in the railing 252 are blocked by the handles 256a-c when the tank lids 248a-c are closed as shown in FIG. 20, but rotate or otherwise move into non-blocking positions when the tank lids 248a-c are opened. In this manner, the handles 256a-c effectively serve as gates that open in conjunction with the opening of the closure assemblies 244a-c, but otherwise remain in a closed or blocking orientation to help enclose the perimeter of platform 250 for safety purposes and form part of the railing 252. Additional description of the manner in which the handle 256a, and by extension the handles 256b-c, may provide such a gate and railing functionality is provided below in conjunction with FIGS. 23 and 24.

Figure 23:
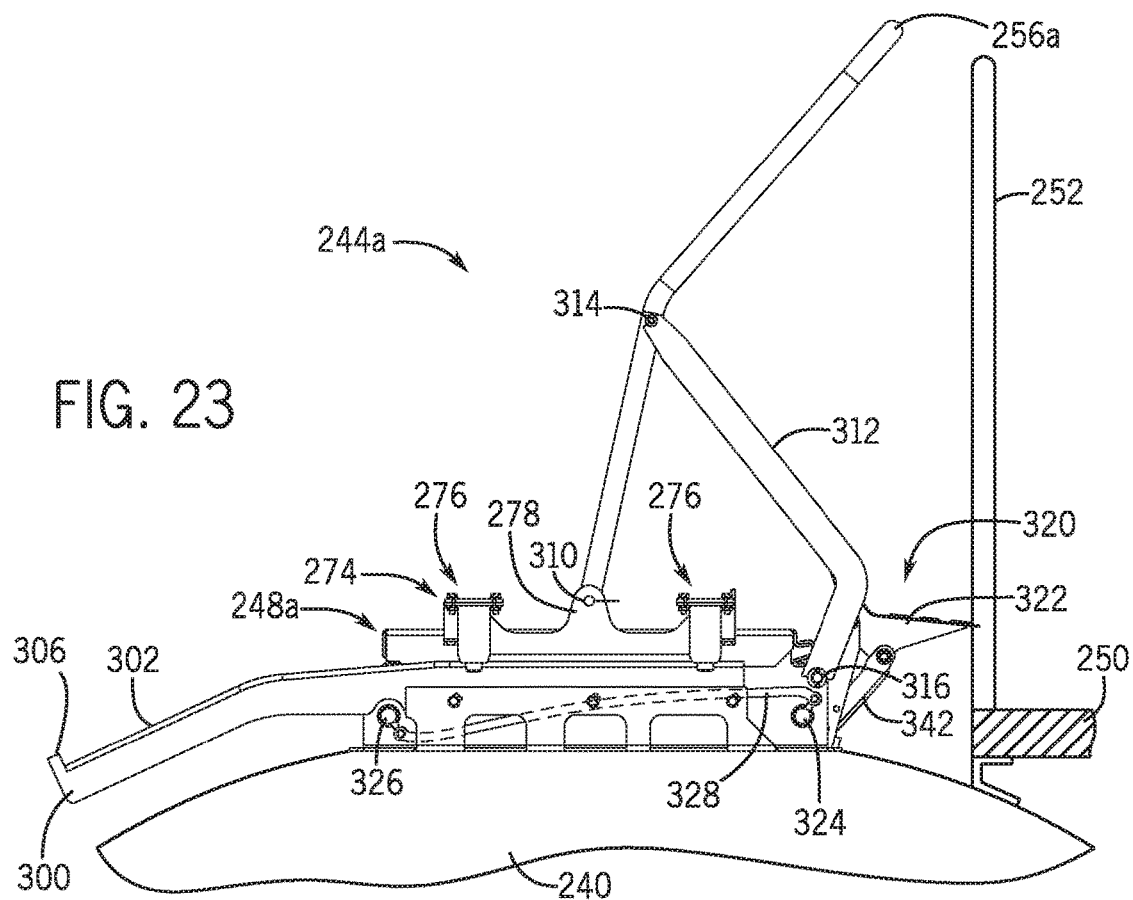
FIGS. 23 and 24 are partial side views thereof in respective closed and open positions.
Figure 24:
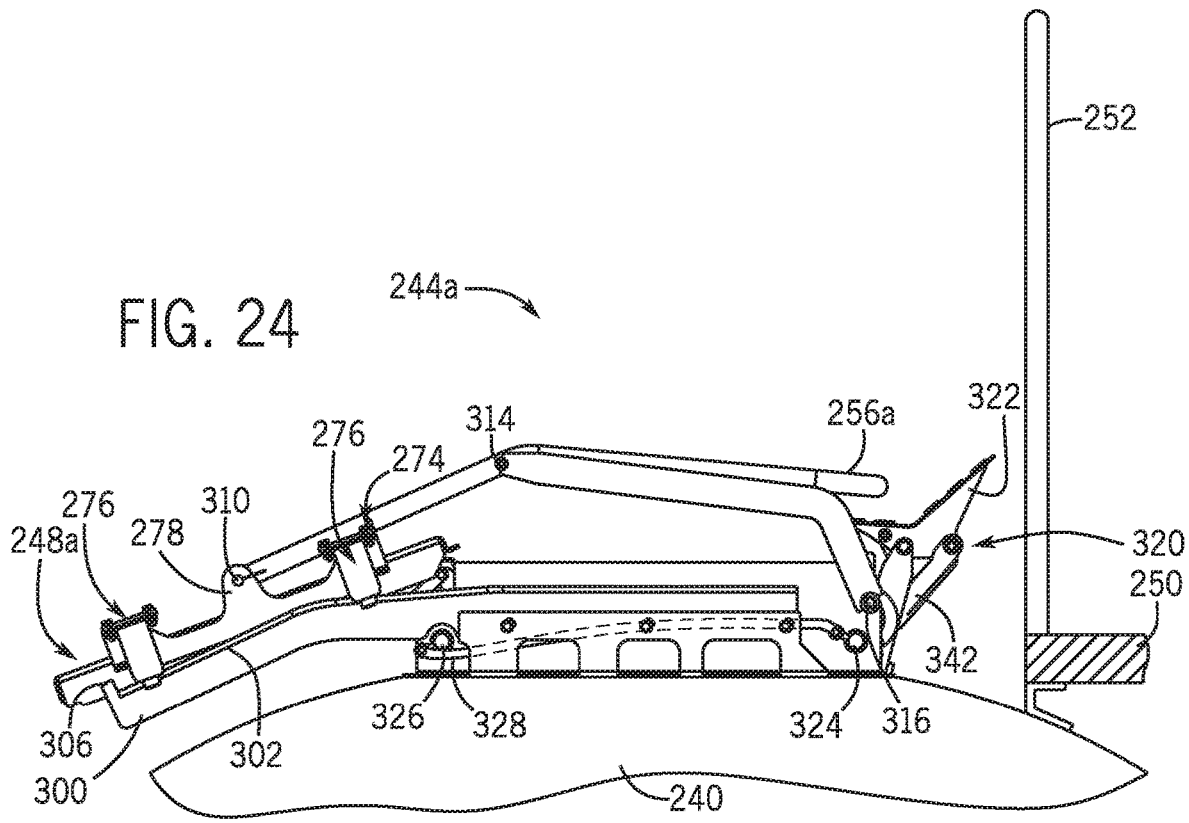
Figure 25:
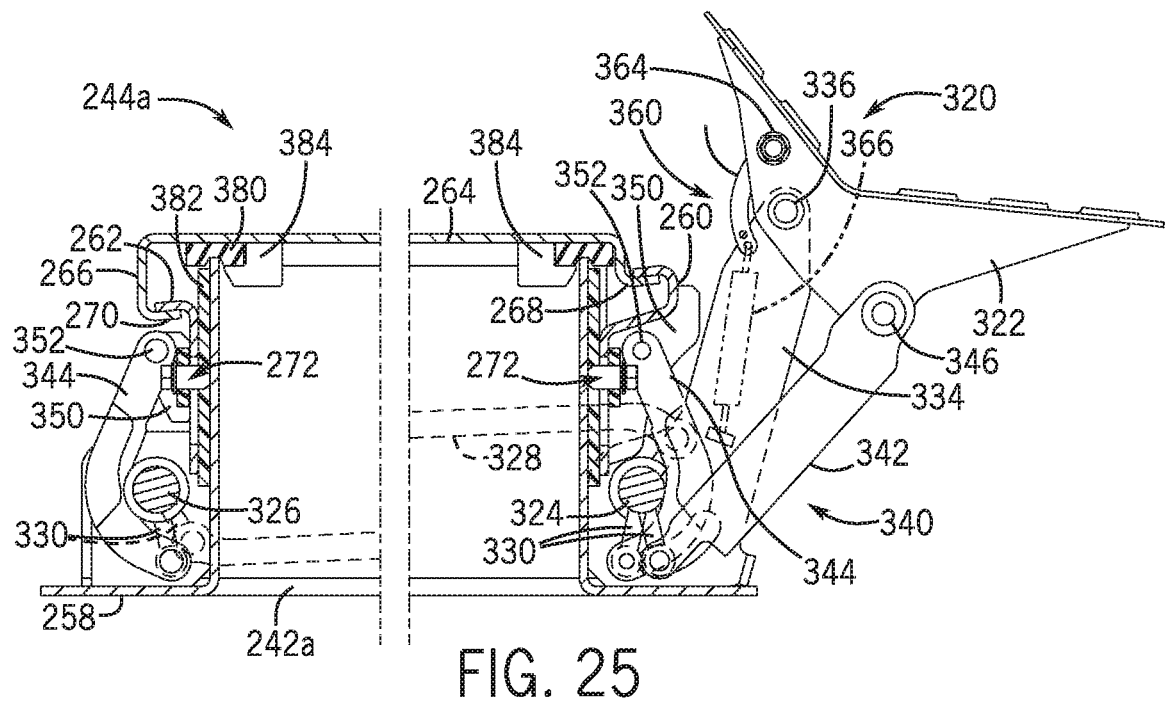
FIGS. 25 and 26 are broken side sectional views thereof illustrating an example latch mechanism shown in respective latched and unlatched orientations.
Figure 26:
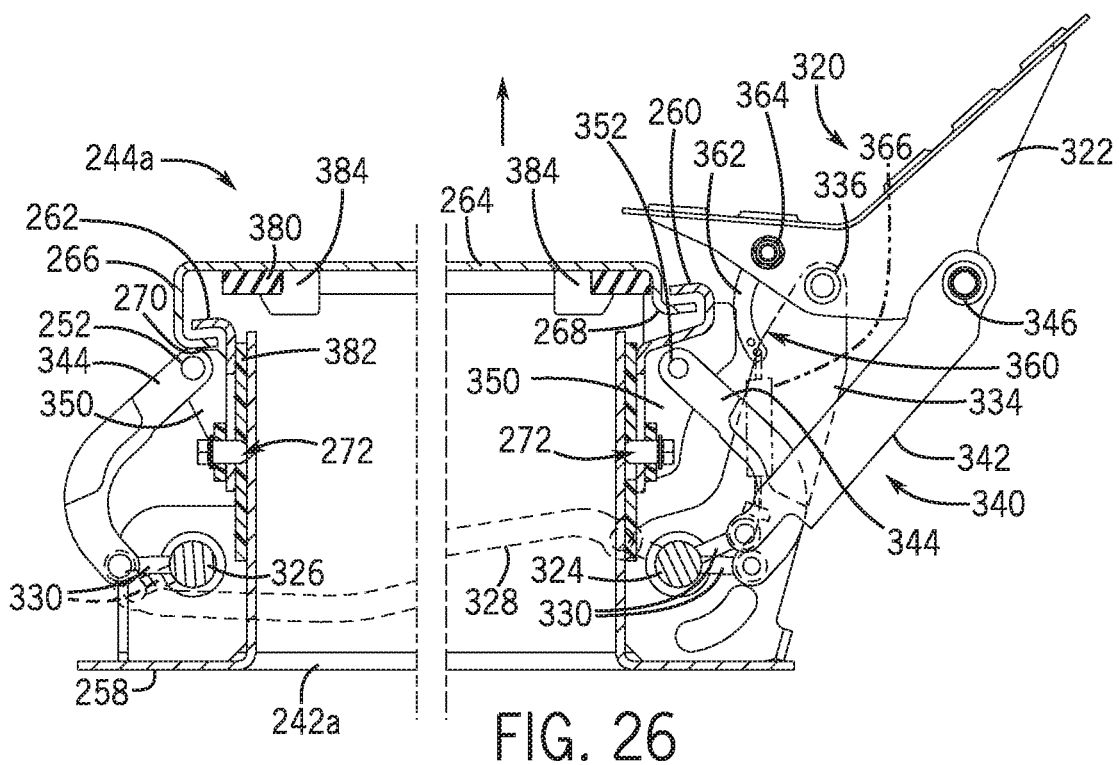
Figure 27:
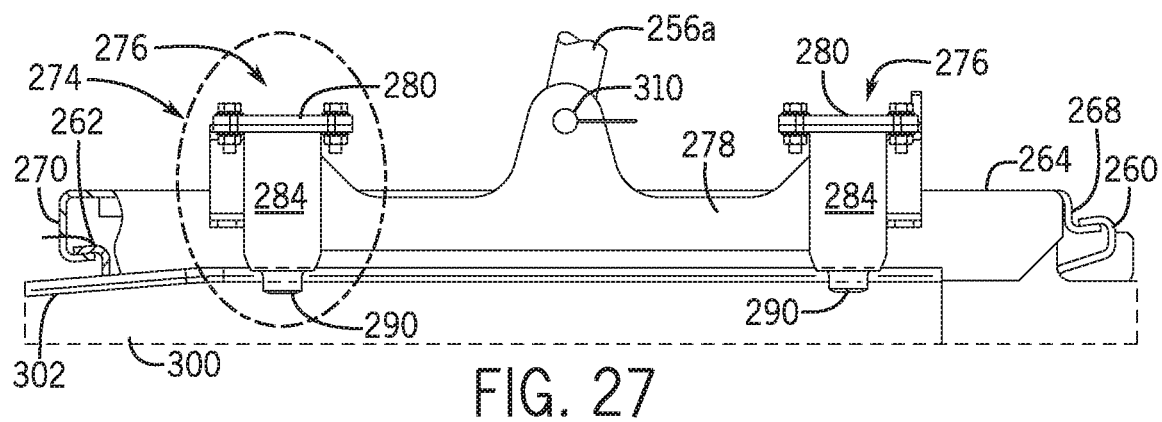
FIGS. 27 and 28 are partial side sectional views thereof illustrating an example lid lift mechanism in the respective latched and unlatched orientations.
Figure 28:
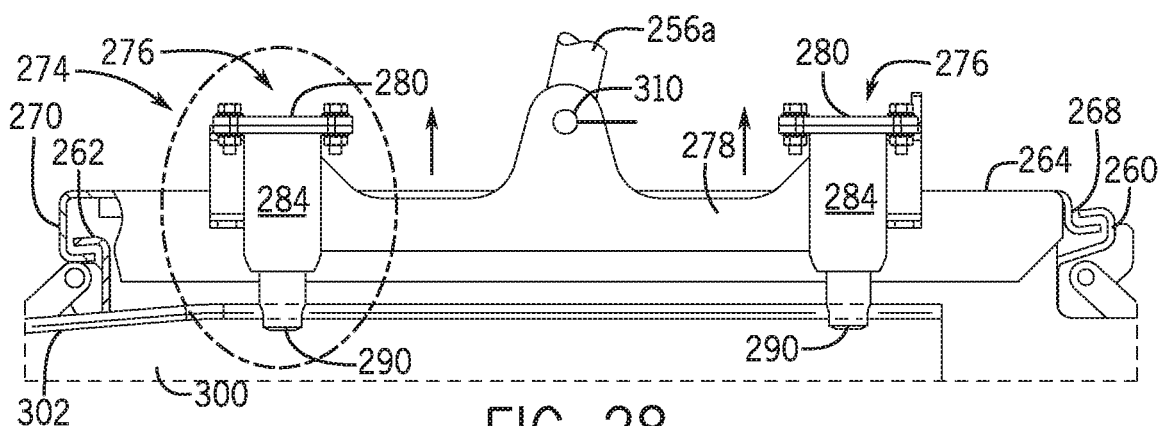
Figure 29:
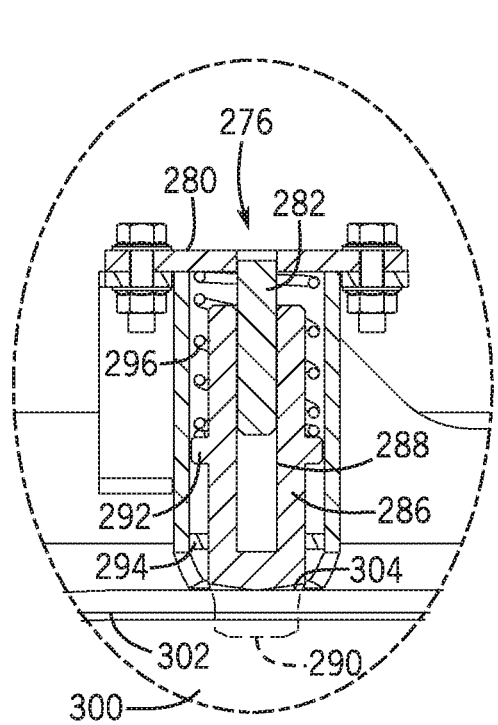
FIGS. 29 and 30 are enlarged detail views of example spring plungers of the lift mechanism in the latched and unlatched orientations.
Figure 30:
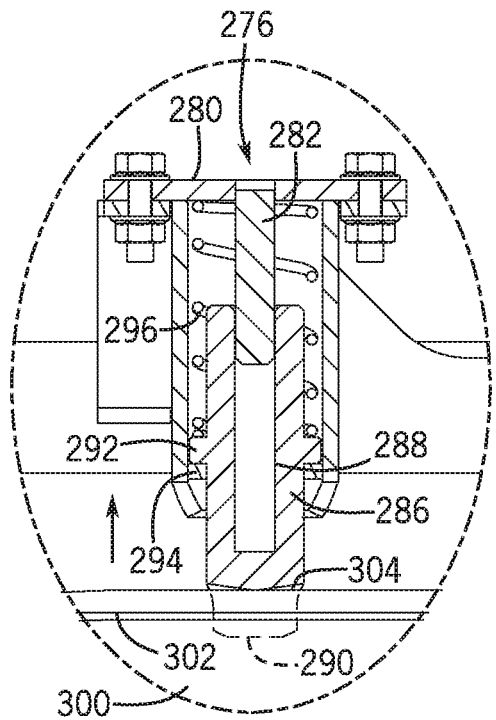

FIGS. 23 and 24 are views of the example closure assembly 244a illustrating the tank lid 248a in open and closed positions, respectively. As the closure assembly 244a is similar to the closure assemblies 244b and 244c shown in FIG. 20, the following description is equally applicable thereto. Referring also to FIGS. 25 and 26, a tank opening flange 258 extends along the periphery of the tank opening 242a. The tank opening flange 258 includes first and second tank flange lips 260, 262, which each extend along a peripheral segment of the tank opening flange 258. The tank flange lips 260, 262 may be formed as separate parts with bends or curls in an upper portion thereof. Similarly, the tank lid 248a includes a substantially flat cover 264 with a lid flange 266, which extends around the periphery of the cover 264 and includes first and second lid lips 268, 270. The lid lips 268, 270 may be formed as separate parts or bends or curls in the underside of the cover 264. The tank flange lips 260, 262 interlace in an overlapping manner with the lid lips 268, 270 to retain the tank lid 248a to the tank opening flange 258.

Referring also to FIGS. 25 and 26, the closure assembly 244a is configured to allow for movement of the tank lid 248a in a direction generally normal to a reference plane of the tank opening 242a before and after sliding laterally (e.g., at least part of the travel being linear and in or near the plane of the tank opening 242a) between the open and closed positions. More specifically, the tank lid 248a may move in a direction toward the tank opening 242a (e.g., downward) in a closed and latched orientation (i.e., an orientation in which the tank lid 248a closes and seals the tank opening 242a), and in a direction away from the tank opening 242a (e.g., upward) when moving to a closed and unlatched orientation (i.e., an orientation in which the tank opening 242a is covered by the tank lid 248a but a seal is not established).

In the illustrated example, this movement and functionality is achieved primarily by the provision of a particular interlacing of the tank flange lips 260, 262 and the lid lips 268, 270 as well as by a lift mechanism, described in detail below. Regarding the interlaced lips, the terminal ends of the tank flange lips 260, 262 at laterally inner and outer sides of the tank opening 242a extend, at least in part, toward a first side (e.g., the laterally outer side) of the pressurized supply tank 240, and the terminal ends of the lid lips 268, 270 extend, at least in part, toward a second, opposite side (e.g., the laterally inner side) of the pressurized supply tank 240. The lips are arranged so that the tank flange lips 260, 262 overlap the lid lips 268, 270 from above (i.e., to the side opposite the tank opening 242a). To permit the lateral sliding of the tank lid 248a to the open position, when the tank lid 248a is in the closed (and latched or unlatched) position, the tank flange lip 260 is to the inside of the lid lip 268. Since the tank lid 248a does not slide laterally to the other (e.g., inner) side of the tank opening 242a, the tank flange lip 262 may, and is, located to the outside to the lid lip 270.

The up/down (e.g., vertical) movement of the tank lid 248a relative to the tank opening flange 258 is facilitated by the tank flange lips 260, 262 being movable mounted to the tank opening flange 258. In the illustrated example, a pin and slot connection 272 is provided at the laterally inner and outer sides of the tank opening flange 258 that allows the tank flange lips 260, 262 to move toward and away from the tank opening 242a, pulling the tank lid 248a therewith in the downward direction. When the tank lid 248a is moved into the closed and latched position shown in FIGS. 21, 22 and 26, a low leakage, 360 degree seal may be created between tank opening flange 258 and the tank lid 248a to sealingly enclose the tank opening 242a. The manner in which the tank opening flange 258, the tank lid 248a, and other structural features of the closure assembly 244a cooperate to effect the seal is described more fully below. First, however, additional description of the manner in which the tank lid 248a of the closure assembly 244a transitions between the open and latched closed positions will be provided.

As mentioned, the closure assembly 244a includes a lift mechanism that supports the tank lid 248a off of the tank opening flange 258 when unlatched. In its most general sense, the lift mechanism may not include any members that provide a biasing lift force. In that case, the lift mechanism may serve primarily to guide the tank lid 248a as it is lifted and then maintain the lid in the raised position, either by its own supporting members or by transferring a supporting force from other mechanisms of the closure assembly 244a. Referring now also to FIGS. 27-30, in the illustrated example, however, the lift mechanism 274 includes a set of spring plungers 276 that provide a biasing force tending to unseat the tank lid 248a. Specifically, in the example closure assembly 244a the lift mechanism 274 includes four spring plungers 276, two spaced apart in the lateral direction on each fore-aft side of the tank opening 242a. Of course, other quantities, spacing and configurations of the spring plungers are possible. Each spring plunger 276 is mounted to a mounting bracket 278 mounted to the fore-aft sides of the tank lid 248a. Specifically, each spring plunger 276 includes a base 280 that bolts to the associated mounting bracket 278, and to which a plunger post 282 is secured (e.g., by press-fit, welding or other secure connection). The plunger post 282 extends from the base 280 inside of a plunger barrel 284 also suitably mounted to the base 280. A spool-shaped plunger 286 fits inside the plunger barrel 284 and has an internal bore 288 that slidably receives the plunger post 282. The plunger barrel 284 is open-ended such that the head 290 of the plunger 286 extends out from (e.g., down below) the plunger barrel 284. A flange 292 on the plunger 286 engages a stop 294 at a tapered section of the plunger barrel 284 to retain the plunger 286. Finally, a spring 296 fits around the plunger post 282 and the plunger 286 and is compressed between the base 280 and the flange 292 to bias the plunger 286 toward the supply tank 240, and thereby the tank lid 248a away from the tank opening 242a in order to impart a lifting force to the tank lid 248a tending to unseat the tank lid 248a from the tank opening flange 258 when in the unlatched orientation of the closure assembly 244a.

The lift mechanism 274 interfaces with the supply tank 240 in a manner to facilitate both the open/close sliding movement and retention of the tank lid 248a. In the illustrated example, the lift mechanism 274 with a pair of rails 300 that at mounted to the supply tank 240 to run along the fore-aft sides of the tank opening 242a. In certain embodiments, the rails may be straight and extend to one side of the supply tank 240. In the illustrated example, however, the rails 300 are bent or curved to generally follow the contour of the supply tank 240. This puts the outer ends of the rails 300 in an unobtrusive orientation that is less likely to interfere with other objects, most notably, the conveyer arm for filling the commodities into the chambers of the supply tank 240. Each of the rails 300 in the example embodiment have an enlarged bead 302 at its upper edge which slidably mates with a complementarily shaped guide channel 304 in the plunger head 290. Sliding friction may be reduced by various means, including the provision of lubricant or by using self-lubricating materials (e.g., various plastics) for either or both of the rail beads 302 and the plunger head 290. The guide channel 304 is an open-ended slot with a narrowed (bottom) end that prevents separation of the plunger head 290, and thus the lift mechanism 274, from the rails 300 once fed onto the rails 300 from the laterally inner ends. Stops 306 are formed in, or mounted to, the laterally outer ends of the rails 300 to prevent the tank lid 248a from derailing in the event the handle 256a is disconnected from the tank opening flange 258 or the tank lid 248a.

An operator utilizes the handle 256a of the closure assembly 244a to move the tank lid 248a between the open and closed positions shown in FIGS. 23 and 24, respectively. The motion path traveled by the tank lid 248a when transitioning between the open and closed positions, and relatedly the manner in which the handle 256a is joined to the tank lid 248a, in the case of the example closure assembly 244a is as follows. The lower ends of the handle 256a are pivotally coupled to the tank lid 248a by hinge joints 310, which are defined by the mounting brackets 278 that couple the lift mechanism 274 to the tank lid 248a. Middle portions of the handle 256a are each pivotally coupled to the upper terminal end of a pivot bar 312 by a hinge joint 314. The opposite, lower terminal ends of the pivot bars 312 are pivotally mounted to the tank opening flange 258, or to other static structure of the supply tank 240 (or the ACD cart 222) by one or more pivotal hinge joints 316.

By virtue of the above-described structural arrangement, an operator standing on the platform 250 (to the right of the handle 256a in FIGS. 23 and 24) may manipulate the handle 256a to move the tank lid 248a from the closed position shown in FIG. 23 to the open position shown in FIG. 24. The tank lid 248a slides open in a laterally outward direction by pushing on the top of the handle 256a, which causes the lower ends of the handle 256a to pivot at the hinge joints 310 as they travel laterally outward with the tank lid 248a. The pivot bars 312 pivot at the middle hinge joints 314 and the lower hinge joints 316 so that the upper ends follow the handle 256a downward and outward. When the tank lid 248a is open, the handle 256a resides in a flat or stowed orientation, as shown in FIG. 24. To close the tank lid 248a, an operator need only pull upwardly on the handle 256a. In response to this manually-applied force, the handle 256a and the pivot bars 312 simultaneously rotate in opposite directions and into the substantially upright positions shown in FIG. 23. Concurrently, a sliding force is exerted on the tank lid 248a at the hinge joints 310 sufficient to move the tank lid 248a into the closed, unlatched position shown in FIG. 26.

As in the previously-described examples, the handle 256a remains readily within the reach of an operator on the platform 250 when the tank lid 248a is in both open and closed positions. The operator need not reach over the tank opening 242a to grasp the handle 256a when the tank lid 248a is open. Furthermore, when the tank lid 248a is moved into the open position by an operator, the handle 256a rotates into a substantially flat or stowed orientation providing unfettered manual access to the tank opening 242a by the operator while standing on the platform 250. By comparison, the handle 256a physically blocks manual access to the covered tank opening 242a by an operator standing on the platform 250 when the tank lid 248a is in the closed position. Specifically, the handle 256a blocks an opening provided in the railing 252 surrounding the platform 250 (FIG. 20) when the tank lid 248a is in the closed position. In this manner, the handle 256a of the closure assembly 244a acts as a gate, which provides manual access to the tank opening 242a when needed, but otherwise cooperates with the railing 252 to enclose the perimeter of the platform 250, and in fact, the horizontal upper end of the acts as part of the railing 252 which an operator may grasp by hand when standing or walking on the platform 250.

The closure assembly 244a further includes a pull-action latch mechanism 320 for selectively latching the tank lid 248a in the closed position. In the illustrated embodiment in which an operator stands above the tank lid 248a when utilizing the handle 256a, the latch mechanism 320 is conveniently implemented as a foot-operated latch. When so implemented, the latch mechanism 320 may include an actuator lever in the form of a pivoting foot pedal 322. In the example shown, the foot pedal 322 is an angled member defining two non-planar treaded upper surfaces, the larger of which is used to apply a latching force (to latch and seal the tank lid 248a), and the smaller of which is used to apply an unlatching force. Various other configurations of co-planar or other non-coplanar (or other) surfaces could be used. The foot pedal 322 is located to the laterally inner side of the tank opening 242a that latches and unlatches the tank lid 248a by operation of a primary rockshaft 324. A secondary rockshaft 326 is located to the laterally outer side of the tank opening 242a and is coupled to the primary rockshaft 324 via connector rods 328 extending along the fore-aft sides of the tank opening 242a. The connector rods 328 are fixed to the rockshafts 324, 326 to impart generally the same pivotal movement (or clocking) to the secondary rockshaft 326 as the primary rockshaft 324. Various mechanisms may be used to connect the connector rods 328 to the rockshafts 324, 326, including via threaded eye bolts 330, as shown in the illustrated example. The threaded shaft of each eye bolt 330 screws into an associated radial opening in the rockshafts 324, 326, and the looped end of each eye bolt 330 hinges to the connector rods 328. Clocking of the two rockshafts 324, 326 may be fine-tuned (either to match or offset the rotation angles) by adjusting (tightening/loosening) the eye bolts 330, and thereby increasing or decreasing the effective distance between the end of one of the connector rods 328 and the associated rockshaft 324, 326. To reduce deflection, the rockshafts 324, 326 may be supported along their lengths by one or more gussets 332 extending from the supply tank 240 and/or the tank opening flange 258. The rockshafts 324, 326 may extend through openings in the gussets 332, and pivoting may be eased by the use of various metal or plastic bushings or various bearings. Two elongated gussets 334, which are also fixed to the supply tank 240 and/or the tank opening flange 258 and support the rockshaft 324 in a similar manner, support the pedal 322 via hinge joints 336.

Pivotal motion is imparted by the pedal 322 to the rockshafts 324, 326 via a linkage assembly 340, which includes a drive link 342 and an over-center link 344. The upper ends of the drive link 342 are connected to the pedal 322 at additional hinge joints 346, and the lower ends of the drive link 342 are connected to the rockshaft 324 via additional eye bolts 330. The upper end of the over-center link 344 is pivotally coupled to a gusset 350 extending from the laterally inner tank flange lip 260 by a hinge joint 352. The lower end of the over-center link 344 is coupled to the rockshaft 324 via another threaded eye bolt 330. In the illustrated example, the over-center link 344 is generally hook or "J" shaped, which allows its lower end to pass beneath the rockshaft 324. The eye bolt connection provides an adjustable threaded connection to the rockshaft 324 and a hinged connection to the over-center link 344. It will be understood that the hinged assembly of the over-center link 344 and the eye bolt 330 provides the over-center functionality, and thus, the assembly may be thought of as "over-center linkage assembly." As will also be understood, the over-center functionality causes the latch mechanism 320 to operate effectively in two states, namely, a "latched" (or "locked") state and an "unlatched" (or "unlocked") state, depending on the position of the over-center link 344, which will be described in detail below. Depending on the size of the tank opening (or other considerations) more than one over-center link may be used so as to provide latching forces to multiple areas of the tank lid 248a. For example, in the illustrated example, the closure assembly 244a includes six over-center links 344 with three connected to each rockshaft 324, 326 via eye bolts 330. The latch mechanism of the closure assembly 244b for the smaller tank opening 244b includes four over-center links, two spaced apart on each lateral side. The multiple over-center links 344, in conjunction with the spring plungers 276 of the lift mechanism 274, provides connection points to the supply tank 240 along all sides of the tank lid 248a at relatively short spans between so as to reduce deflection of the tank lid 248a and improve sealing.

In addition, the latch mechanism 320 may include a tensioner assembly 360 that applies a biasing force that gently resists the latching actuation of the pedal 322 and assists in the unlatching actuation of the pedal 322. The tensioner assembly 360 also supports the flange lips 260, 262 to keep them raised and in position to allow the tank lid 248a to move into the opened and be returned to the closed position without interference. As an example, the tensioner assembly 360 may include a short, curved connector link 362 hinged to the pedal 322 at hinge joint 364 and connected to an upper end of a spring 366, the other end of which is connected to one of the gussets 334. Further, although not included in the illustrated example, a locking mechanism may be provided, for example as a pin and slot arrangement, such as a slot in one of the gussets 334 and a pin extending from the drive link 342 into the slot. Various other position locking mechanisms (similar to locking mechanism 92 above) may be included as well.

A low leakage, 360 degree seal is created between the tank lid 248a and the tank opening flange 258, when the tank lid 248a is moved into the closed and latched position shown in FIG. 25. In certain embodiments, the tank lid 248a may directly contact the tank opening flange 258, such that a metal-on-metal seal is created. A more robust seal may be created, however, by positioning one or more compressible seals between the tank lid 248a and the tank opening flange 258. In the illustrated example, a compressible seal 380 is disposed between the tank lid 248a and an upper edge of the tank opening flange 258, being mounted to the underside of the tank lid 248a or onto the upper edge 382. The seal 380 may be integrally formed as a single (e.g., molded) piece, which forms a complete ring having a planform shape generally conforming to the shape of the tank lid 248a. Alternatively, the seal 380 may be made up of discrete pieces, which are separately affixed to the tank lid 248a or tank opening flange 258. In various embodiments, the compressible seal 380 may be of any suitable shape and composition (e.g., cast urethane) and affixed in any suitable manner (e.g., glued, bolted, and so on). The seal 380 may be guided by or seated around one or more alignment tabs 384 extending down from the underside of the tank like 248a. The alignment tabs 384 are tapered to provide a centering function for ensure that the seal 380 is centered on the tank opening flange 258.

Having described the various details, the operation of the example embodiment will not be described. After the tank lid 248a has been slid into the closed, but unlatched, position shown in FIG. 26, an operator may latch the tank lid 248a by stepping down (toward the supply tank 240) on the large, raised upper (laterally inner) surface (right in FIG. 26) of the pedal 322. The pedal 322 is depressed against the biasing forces of the lift mechanism 274 as well as that of the tensioner assembly 360, thereby compressing both in the direction of closing the tank lid 248a. This causes the drive link 342 to swing downwardly (toward the supply tank 240) and drive rotation of the rockshaft 324 in a clockwise direction (and, via the connector rods 328, the rockshaft 326 in a counter-clockwise direction) from the view shown in FIG. 25. Rotation of the rockshafts 324, 326, in turn drives the lower ends of the over-center links 344 (clockwise/counter-clockwise) and simultaneously translates the upper ends of the over-center links 344 to pull the tank flange lips 260, 262 downward toward the tank opening 242a. The tank flange lips 260, 262 thus engage the lid lips 268, 270 and pull the tank lid 248a downward toward the tank opening 242a to seat and compress the seal 380 against the upper edge 382 of the tank opening flange 258. In this motion, the over-center links 344 move past "center" or the point where the over-center links 344 act as a mechanical stop to prevent back-driving, and thus effectively "locking" the latch mechanism 320, and thereby the tank lid 248a. This motion also moves the pedal 322 against the tensioner assembly 360. By way of one non-limiting example, the "center" location of the over-center links 344 may be occur when the lower ends of the over-center links 344 are at approximately 10-20 degrees past vertical. Further, the over-center links 344 may pivot approximately 100 degrees between the latched and unlatched orientations, and they may be clocked slightly offset (i.e., further clockwise about the rockshaft 324) from the drive link 342 by approximately 10-20 degrees. This may vary in certain applications, and the clocking of the drive link 342 and the clocking and center location of the over-center link 344 may be fine-tuned by adjusting the associated eye-bolts 330.

The tank lid 248a is unlatched by the operator stepping down on the smaller, now raised, upper (laterally outer) surface (left in FIG. 25) of the pedal 322. This causes the drive link 342 to swing upward away from the tank opening and counter-rotate the rockshafts 324, 326. Aided by the pre-load of the lift mechanism 274, the tensioner assembly 360, and the seal 380, the over-center links 344 are back-driven to permit the tank flange lips 260, 262 to raise away from the tank opening 242a. This, in turn, permits the tank lid 248a to lift off of the tank opening flange 258 and unseat the seal 380. The lift mechanism 274 supports the tank lid 248a in the closed, but unlatched position shown in FIG. 26, allowing an operator to move open the tank opening 242a by sliding the tank lid 248a to the open position shown in FIG. 24 using the handle 256a, as described above. As noted, the tensioner assembly 360 supports the flange lips 260, 262 to keep them raised and in position to allow the tank lid 248a to move into the opened and be returned to the closed position without interference.

There has thus been provided multiple example embodiments of closure assemblies having pressure energized, under seal lids and other non-pressure energized lids. In the former case, the closure assemblies are configured such that increasing pressure loading on a tank lid (specifically, increasing pressure exerted on the interior of the tank lid) tends to reinforce rather than compromise the seal formed by the closure assembly when the tank lid is closed. In the latter case, over-center linkage assemblies may be used to apply and maintain a closing force on the tank lid, and a lift mechanism may raise (or support when raised) the tank lid off of the tank opening flange to permit the transition to open. The closure assemblies may be utilized to sealingly enclose the tank openings of an agricultural machine, such as an ACD cart. Embodiments of the closure assemblies may include handles, which project upwardly from the tank lids to provide easily manual access in embodiments wherein the closure assemblies are manually opened by an operator standing above the tank lids. The handles usefully provide a gate and railing function by blocking openings in the railing of the platform when the tank lids are in closed positions, while rotating or otherwise moving into a position permitting unfettered manual access to the tank openings when the tank lids are opened. Embodiments of the closure assembly may further allow the sealing interface formed between the tank lid and the tank opening to fully unseat with a relatively short travel of the tank lid away from the closed position. In still further embodiments, the closure assemblies may include pull-action latches, which exert lateral and/or transverse closure forces in the direction in which the tank lids are closed when the latches are engaged to help seal any vertical transition (or other) areas of the seal interfaces, and thereby further enhance seal integrity. The latch may be foot-operated in embodiments wherein the closure assemblies are manually opened by an operator standing above the tank lids.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "aft," "lateral," "horizontal," and "vertical" may be used. Such terms are defined, at least in part, with respect to the direction in which the tillage implement is towed or otherwise moves during use. The term "forward" and the abbreviated term "fore" (and any derivatives and variations) refer to a direction corresponding to the direction of travel of the tillage implement, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Moreover, the terminology used herein is for the purpose of describing particular embodiments only and is not intended to be limiting of the disclosure. Thus, it will be appreciated that the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared centerline, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Similarly, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. In a work machine having a supply tank with a tank opening, a closure assembly configured to close the tank opening comprising:
a lid;
an actuator mechanism mounted to the lid to slide the lid linearly with respect to the tank opening during at least part of a travel between first and second positions in which in the first position the lid overlies the tank opening and in the second position the lid is substantially clear of the tank opening;
a latch mechanism movable into a latched orientation in which when the lid is in the first position the latch mechanism latches the lid into engagement with the tank opening; and
a tank opening flange configured to mount to the tank and surround the tank opening, the tank opening flange having at least one flange lip that is movable with respect to the tank opening flange and that engages at least one lip of the lid when the latch mechanism is in the latched orientation, wherein the at least one flange lip moves as the latch mechanism latches the lid into engagement with the tank opening.

2. The closure assembly of claim 1, further comprising at least one seal arranged in sealing engagement with the lid and the tank opening when the lid is in the first position and the latch mechanism is in the latched orientation.

3. The closure assembly of claim 1, further including a lift mechanism mounted between the lid and the tank opening and configured to support the lid off of the tank opening when the closure assembly is attached to the tank;
wherein the latch mechanism is movable into an unlatched orientation in the first and second positions of the lid; and
wherein, when the latch mechanism is in the unlatched orientation and the lid is in the first position, the lift mechanism applies a biasing force that raises the lid to separate the lid from the tank opening.

4. The closure assembly of claim 3, wherein the lift mechanism includes at least one spring and plunger arrangement, the spring biasing the plunger to extend.

5. The closure assembly of claim 4, further including a mounting rail slidably engaged by the plunger.

6. The closure assembly of claim 1, wherein the latch mechanism includes an over-center arrangement.

7. The closure assembly of claim 6, wherein the latch mechanism includes a link connecting a rockshaft to an actuator lever; and
wherein pivoting the actuator lever rotates the rockshaft to pivot the link over-center.

8. The closure assembly of claim 7, wherein the link is coupled to the rockshaft by a connector that is adjustable to change a distance between the link and the rockshaft.

9. The closure assembly of claim 7, wherein the latch mechanism is foot-operated; and
wherein the actuator lever is a pedal.

10. The closure assembly of claim 7, wherein the latch mechanism includes a plurality of links connected to the rockshaft; and
wherein pivoting the actuator lever rotates the rockshaft to pivot the links over-center.

11. The closure assembly of claim 10, wherein the latch mechanism includes a plurality of rockshafts including one disposed on each of two opposite sides of the lid; and
wherein one or more of the links is connected to each rockshaft.

12. The closure assembly of claim 11, wherein the latch mechanism includes a connector link coupling the rockshafts on opposite sides of the lid such that pivoting the actuator lever rotates the rockshafts.

13. The closure assembly of claim 1, wherein the lid has at least one guide slidably engageable with at least one guide rail of the tank.

14. The closure assembly of claim 1, wherein the actuator mechanism includes a handle mountable to the lid and the tank for movement of the lid between the first and second positions;
wherein a lower end of the handle is connected to the lid and an upper end of the handle forms a handrail extending above the lid in the first position; and
wherein the lower end of the handle moves in a direction of movement of the lid and the upper end of the handle moves in a direction different from the direction of movement of the lid.

* * * * *